(12) United States Patent
Aliwarga et al.

(10) Patent No.: US 12,441,241 B2
(45) Date of Patent: Oct. 14, 2025

(54) OCCUPANT PROTECTION DEVICE AND OCCUPANT PROTECTION METHOD

(71) Applicant: DAICEL CORPORATION, Osaka (JP)

(72) Inventors: Eric Aliwarga, Tokyo (JP); Kenji Fukumoto, Tokyo (JP); Masayuki Yamazaki, Tokyo (JP)

(73) Assignee: Daicel Corporation, Osaka (JP)

( * ) Notice: Subject to any disclaimer, the term of this patent is extended or adjusted under 35 U.S.C. 154(b) by 174 days.

(21) Appl. No.: 18/237,118

(22) Filed: Aug. 23, 2023

(65) Prior Publication Data

US 2023/0391257 A1  Dec. 7, 2023

Related U.S. Application Data

(63) Continuation of application No. PCT/JP2022/002641, filed on Jan. 25, 2022.

(30) Foreign Application Priority Data

Feb. 26, 2021  (JP) ................. 2021-030999

(51) Int. Cl.
  *B60Q 9/00*   (2006.01)
  *B60R 21/015*  (2006.01)
  *B60R 21/01*   (2006.01)

(52) U.S. Cl.
  CPC ........ *B60Q 9/008* (2013.01); *B60R 21/01552* (2014.10); *B60R 2021/01034* (2013.01); *B60R 2021/01286* (2013.01)

(58) Field of Classification Search
  CPC ....... B60Q 9/008; B60R 21/01; B60R 21/015; B60R 21/01512; B60R 21/01552; B60R 2021/01034; B60R 2021/01286
  See application file for complete search history.

(56) References Cited

U.S. PATENT DOCUMENTS

2005/0061569 A1   3/2005  Pascolo et al.

FOREIGN PATENT DOCUMENTS

| DE | 102009055956 A1 * | 6/2011 | ........... B60N 2/0276 |
| DE | 102017221456 A1 * | 5/2019 | |

(Continued)

OTHER PUBLICATIONS

Krick, C; DE 10 2009 055 956, machine translation. (Year: 2011).*

(Continued)

*Primary Examiner* — Mark L. Greene
(74) *Attorney, Agent, or Firm* — WHDA, LLP

(57) ABSTRACT

An occupant protection device includes a first sensor configured to output vehicle information indicating a traveling state of a vehicle and a situation around the vehicle, a second sensor configured to output occupant information indicating a seating state of an occupant, a stimulus application unit that is to be worn by the occupant and is configured to apply a stimulus to the occupant, and a controller configured to control the stimulus application unit. The controller predicts an impact to be received by the vehicle, determines a stimulus application content by the stimulus application unit necessary for correcting a posture of the occupant to a posture prepared for the impact when the impact is predicted, and activates the stimulus application unit in accordance with the determined stimulus application content and thus corrects the posture of the occupant prior to a timing when the vehicle receives the impact.

12 Claims, 27 Drawing Sheets

(56) References Cited

FOREIGN PATENT DOCUMENTS

DE    10 2018 205 577 A1    10/2019
JP         2019-156179 A     9/2019
JP         2020-131882 A     8/2020

OTHER PUBLICATIONS

Franz, M; DE 10 2017 221 456, machine translation. (Year: 2019).*
Nambu, Y; JP 2019-156179, machine translation. (Year: 2019).*
International Search Report dated Mar. 8, 2022, issued in counterpart International Application No. PCT/JP2022/002641, with English Translation. (5 pages).
Written Opinion of the International Searching Authority (Form PCT/ISA/237) dated Mar. 8, 2022, issued in counterpart International Application No. PCT/JP2022/002641, with English Translation. (8 pages).

* cited by examiner

OCCUPANT PROTECTION DEVICE AND OCCUPANT PROTECTION METHOD

TECHNICAL FIELD

The present invention relates to an occupant protection device and an occupant protection method.

BACKGROUND ART

Patent Document 1 discloses a device that corrects the posture of an occupant and improves occupant protection performance by energizing, based on a predicted collision direction and the posture of the occupant, an electrode selected from a plurality of electrodes that are provided on a seat to allow the occupant to take a posture close to that prepared for a predicted collision when a collision of a vehicle is predicted.

CITATION LIST

Patent Document

Patent Document 1: JP 2019-156179 A
Patent Document 2: DE 10 2018 205 577 A1

SUMMARY OF INVENTION

Technical Problem

As described in Patent Document 1, when the electrodes are provided on the seat of the vehicle, clothing is present between the electrodes and the skin of the occupant. Accordingly, electricity is difficult to flow depending on the number of pieces of intervening clothing and the material of the clothing, and thus there was a problem that a stimulus cannot be sufficiently applied.

Furthermore, there was a problem that a position of the occupant where the electrodes come into contact varies depending on the physique of the occupant and a stimulus cannot be appropriately applied, so that the posture cannot be appropriately controlled.

Furthermore, there was a problem that when the electrodes are energized and the body of the occupant moves, the body moves away from the electrodes, so that the displacement of the body for avoiding an impact ends insufficiently.

The technique according to the present disclosure has been made in view of the above circumstances, and an object of the present disclosure is to provide a technique that appropriately controls the posture of an occupant and thereby improves occupant protection performance.

Solution to Problem

In order to solve the problem described above, an occupant protection device according to the present disclosure includes: a first sensor mounted on a vehicle and configured to output vehicle information including information indicating a traveling state of the vehicle and information indicating a situation around the vehicle; a second sensor mounted on the vehicle and configured to output occupant information indicating a seating state of an occupant in the vehicle; at least one stimulus application unit that is to be worn by the occupant and is configured to apply a stimulus to the occupant during operation; and a controller configured to control the stimulus application unit. The controller predicts, based on the vehicle information acquired from the first sensor, an impact to be received by the vehicle; when the impact on the vehicle is predicted, determines, based on the occupant information acquired from the second sensor, a stimulus application content by the stimulus application unit necessary for correcting a posture of the occupant to a posture prepared for the impact on the vehicle; and activates the stimulus application unit in accordance with the determined stimulus application content and thus corrects the posture of the occupant prior to a timing when the vehicle receives the impact.

The controller may determine an impact mode of the vehicle based on the vehicle information and determine the stimulus application content in accordance with the determined impact mode.

The stimulus application unit may apply at least one external stimulus of an electric current, heat, pressure, or vibration to the occupant.

The occupant protection device may include a plurality of the stimulus application units, and the controller may activate the plurality of stimulus application units when the impact on the vehicle is predicted.

The controller may activate the plurality of stimulus application units at different timings.

In the occupant protection device, the plurality of stimulus application units may include a first stimulus application unit and a second stimulus application unit. The controller may activate the first stimulus application unit in accordance with the stimulus application content determined when the impact on the vehicle is predicted, then further determine, based on the occupant information acquired from the second sensor, a second stimulus application content necessary for correcting the posture of the occupant to a posture prepared for the impact on the vehicle, and activate the second stimulus application unit in accordance with the determined second stimulus application content.

The occupant protection device may further include an auxiliary stimulus application unit configured to give sound or an image as a stimulus to the occupant. When the impact on the vehicle is predicted, the controller may supplementally activate the auxiliary stimulus application unit prior to a timing when the vehicle receives the impact.

The stimulus application unit may include an electrode to be worn near a left ear of the occupant and an electrode to be worn near a right ear of the occupant, and apply a stimulus to the occupant when electricity flows between the left and right electrodes.

The stimulus application unit may include a first electrode to be worn near and in front of an ear of the occupant and a second electrode to be worn near and behind the ear of the occupant, and apply a stimulus to the occupant when electricity flows between the first electrode and the second electrode.

The stimulus application unit may include a wearing unit to be worn by the occupant; and a stimulus applying pad disposed on the wearing unit such that the stimulus applying pad is to be in contact with skin of the occupant wearing the wearing unit.

The stimulus application unit may include an actuator to be worn on an ear auricle of the occupant, and apply a stimulus to the occupant by pulling the ear auricle with the actuator.

The stimulus application unit may include vibrators mounted respectively on left and right shoulders of the occupant, and apply a stimulus to the occupant by vibration of the vibrators.

In order to solve the problem described above, an occupant protection method according to the present disclosure, executed by a controller of an occupant protection device mounted on a vehicle, the occupant protection device including at least one stimulus application unit that is to be worn by an occupant of the vehicle and is configured to apply a stimulus to the occupant during operation, the occupant protection method includes:

acquiring vehicle information including information indicating a traveling state of the vehicle and information indicating a situation around the vehicle from a first sensor mounted on the vehicle and predicting, based on the acquired vehicle information, an impact to be received by the vehicle;

acquiring occupant information indicating a seating state of the occupant in the vehicle from a second sensor mounted on the vehicle and when the impact on the vehicle is predicted, determining, based on the acquired occupant information, a stimulus application content by the stimulus application unit necessary for correcting a posture of the occupant to a posture prepared for the impact on the vehicle; and activating the stimulus application unit in accordance with the determined stimulus application content and thus correcting the posture of the occupant prior to a timing when the vehicle receives the impact.

Advantageous Effects of Invention

According to the present disclosure, a technique that appropriately controls the posture of an occupant and thereby improves occupant protection performance can be provided.

DESCRIPTION OF EMBODIMENTS

First Embodiment

An occupant protection device according to an embodiment of the present disclosure will be described below with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiments and is limited only by the claims.

System Configuration

Figure 1:
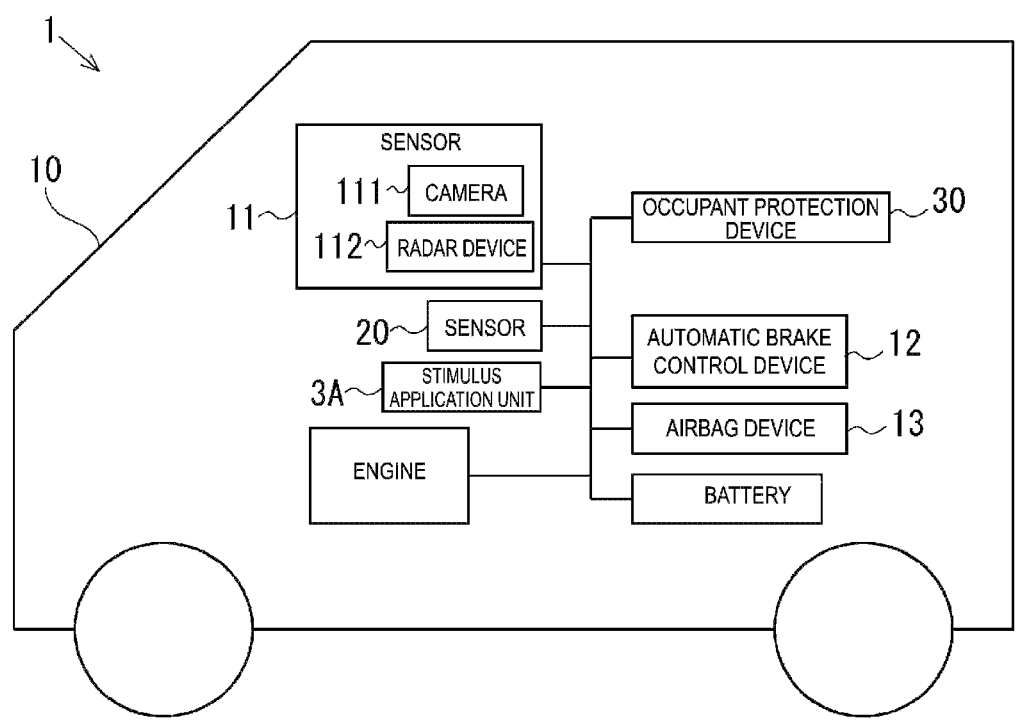
FIG. 1 is a diagram illustrating the configuration of an occupant protection system.

An occupant protection system 1 illustrated in FIG. 1 includes a plurality of sensors 11 that detect a state of a vehicle 10, a sensor 20 that detects a state of an occupant, and an occupant protection device 30. The occupant protection device 30 includes a stimulus application unit 3A to be worn by an occupant. The occupant protection device 30 protects the occupant by predicting, based on vehicle information acquired from the sensor (a first sensor) 11, an impact to be received by the vehicle controlling the stimulus application unit 3A to apply a stimulus to the occupant immediately before the vehicle 10 receives the impact, and controlling the occupant to cause the occupant to take a posture prepared for the impact.

Vehicle

The vehicle 10 includes the various sensors 11, 20, an automatic brake control device 12, and an airbag device 13.

A plurality of the sensors 11 include, for example, a sensor (the first sensor) that detects states of own vehicle, such as a vehicle speed, a travel distance, an operating state of a brake, an operating state of a direction indicator, a steering state, a yaw rate, and the gravity (G). Also, the sensors 11 include, for example, a sensor (the first sensor) that detects a state of another vehicle or an obstacle present around the own vehicle 10, such as a device that detects an obstacle by capturing an image of the surroundings of the vehicle 10 by a camera and performing image processing on the captured image or a radar device that detects an obstacle, for example, a laser radar, a millimeter wave radar, or the like.

The sensor 20 is a second sensor for detecting a seating state of the occupant, such as a posture, a position, or the like of the occupant seated on a seat of the vehicle and is, for example, a camera that captures an image of the inside of the vehicle or a seat sensor.

The automatic brake control device 12 detects an obstacle present in the traveling direction of the vehicle 10 by the sensors 11, and obtains a distance (stopping distance) required to stop the vehicle 10 without a collision with the obstacle from the relative speed, jerk, or the like of the own vehicle 10 with respect to the obstacle. Then, in a case where the distance between the vehicle and the obstacle approaches the stopping distance, the automatic brake control device 12 causes the brake to automatically operate such that sudden braking is performed. Additionally, since a known technique can be used for a specific condition by which the automatic brake is caused to operate, the detailed description thereof will be omitted.

In a case where the acceleration detected by the sensor 11 exceeds a threshold value, the airbag device 13 deploys an airbag, for example, by causing an inflator to operate. Note that the sensor 11 that detects the acceleration may be provided exclusively for the airbag device 13 or may also be used for the occupant protection device 30.

Occupant Protection Device

Figure 2:
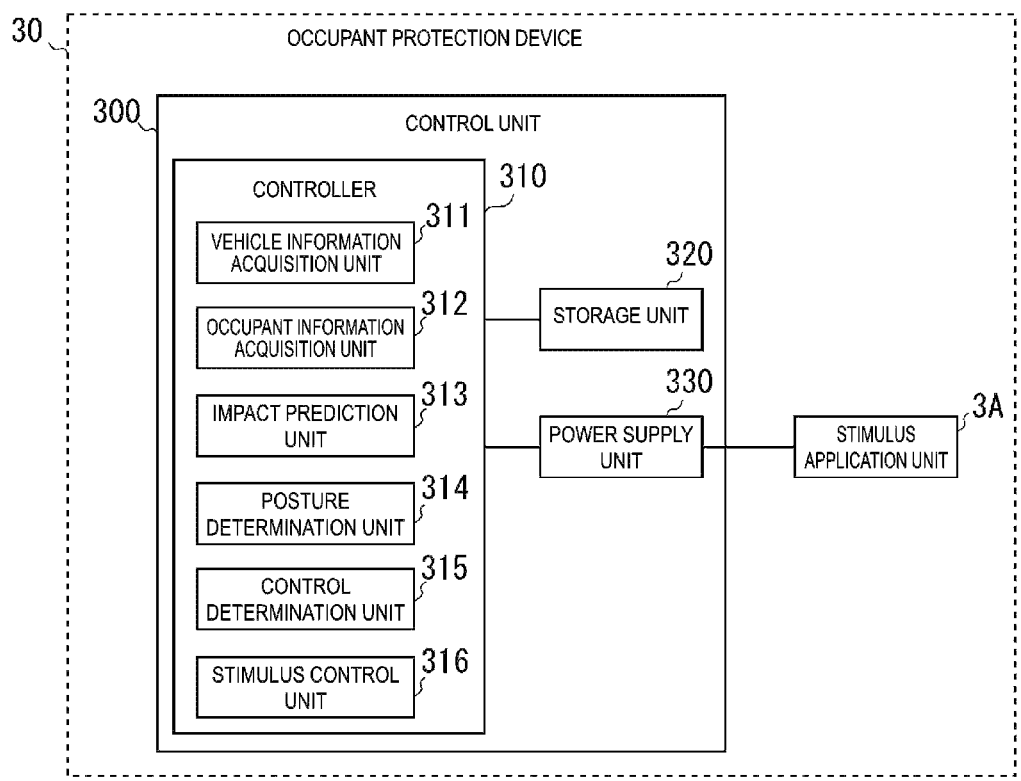
FIG. 2 is a diagram illustrating the configuration of an occupant protection device.

FIG. 2 is a diagram illustrating the configuration of the occupant protection device 30. The occupant protection device 30 includes a controller 310, a storage unit 320, a power supply unit 330, and the stimulus application unit 3A. In the present embodiment, of these elements, the controller 310, the storage unit 320, and the power supply unit 330 are housed in one enclosure to form a control unit 300, and the control unit is a separate body from the stimulus application unit 3A. The controller 310 includes a processor such as a central processing unit (CPU), a digital signal processor (DSP), or a field-programmable gate array (FPGA), and a main storage unit such as a random access memory (RAM) or a read only memory (ROM).

The storage unit (an auxiliary storage unit) 320 includes a storage medium, for example, a volatile memory such as a RAM, a nonvolatile memory such as a ROM, an erasable programmable ROM (EPROM), a hard disk drive (HDD), or a removable medium. Additionally, the removable medium is, for example, a USB (universal serial bus) memory or a disc recording medium such as a CD (compact disc), a DVD (digital versatile disc), or a BD (Blu-ray (registered trademark) disc). In addition, by using a computer-readable recording medium such as a memory card that can be mounted from the outside, the storage unit 320 may be configured.

The storage unit 320 can store an operating system (OS), various programs, various data tables, various databases, setting data, user data, and the like for performing the operation of the occupant protection device 30.

The power supply unit 330 is connected to a vehicle side battery and the stimulus application unit 3A, converts power supplied from the battery, in response to a control signal determined by the controller 310 as described below, and supplies the converted power to the stimulus application unit 3A.

The controller 310 reads out a program stored in the storage unit 320 to a work area of the main storage unit and executes the program to control each constitutional unit and the like and thus functions as predetermined functional units, for example, a vehicle information acquisition unit 311, an occupant information acquisition unit 312, an impact prediction unit 313, a posture determination unit 314, a control determination unit 315, and a stimulus control unit 316. In addition, these functional units are not limited to those implemented based on a program (software), and some or all of the functional units may be configured using a hardware circuit such as a processor, an integrated circuit, or a logic circuit.

The vehicle information acquisition unit 311 acquires, from the sensor 11 mounted on the vehicle 10, information indicating a traveling state of the vehicle 10 and information indicating a situation around the vehicle as vehicle information.

The occupant information acquisition unit 312 detects, from the sensor 20, occupant information indicating a state such as a posture or position of an occupant in the vehicle 10.

The impact prediction unit 313 predicts, based on the vehicle information, an impact to be received by the vehicle 10 due to a collision or the like. The impact prediction unit 313 acquires information on the surroundings from the radar device 112 or the camera 111, for example. The radar device 112 includes a plurality of radar devices having different detection ranges, detects an object such as another vehicle or an obstacle present around the own vehicle 10 including the front side, the right lateral side, the left lateral side, and the rear side of the own vehicle 10, and acquires relative positions and relative speeds of the own vehicle and the detected object.

The camera 111 includes a plurality of cameras having different imaging ranges, captures an image of the surroundings of the own vehicle 10 including the front side, the right lateral side, the left lateral side, and the rear side of the own vehicle 10, and outputs the captured image. The impact prediction unit 313 performs image processing on the captured image (vehicle information) acquired from the camera 111, and acquires an object such as another vehicle or an obstacle present around the vehicle. In addition, the impact prediction unit 313 may extract an image of an object detected by the radar device 112 from an image captured by the camera 111 and specify a type of the object such as a pedestrian, a regular passenger car, or a heavy truck by image processing.

For example, when an object such as another vehicle is detected around the vehicle 10, the impact prediction unit 313 estimates a distance required for collision avoidance (avoidable distance) such as a stopping distance from a relative speed, acceleration, jerk, and the like with respect to the object, compares a distance between the object and the own vehicle 10 with the avoidable distance, and predicts whether the vehicle will collide, that is, whether the vehicle will receive an impact. Additionally, the impact prediction may be performed by using the determination result by the automatic brake control device 12. Furthermore, when predicting that the vehicle 10 will collide with an object such as another vehicle, the impact prediction unit 313 obtains, based on a traveling direction (moving trajectory) of the approaching object, a direction in which the object will collide with the vehicle 10, that is, a direction in which the vehicle 10 will receive the impact. Furthermore, the impact prediction unit 313 may obtain strength based on the speed relative to the object, the size of the object, or the like. Note that the impact prediction unit 313 sets an impact mode in advance in accordance with the direction, for example, whether the vehicle will be hit from the front or lateral side or from the rear side, and strength of the impact, the type of the colliding object, the vehicle speed at the time of the collision, and the like, and determines the impact mode in accordance with the predicted direction, strength, and the like of the impact.

Although the impact prediction unit 313 of the present embodiment predicts an impact based on the vehicle information acquired from the radar device 112 and the camera 111, the impact prediction unit 313 may predict an impact by using information acquired from a sensor other than the radar device 112 and the camera 111 or by using the vehicle information acquired from one of the radar device 112 and the camera 111. In addition, the impact prediction unit 313 may sense (predict) an impact other than a collision, i.e., an impact (G) received by the occupant due to, for example, a sudden turn, a sudden braking, a slip on a slippery road surface, a rollover of the vehicle, or the like.

The posture determination unit 314 obtains, based on the occupant information, the posture of the occupant at the present moment. For example, the posture determination unit 314 detects, by a seat sensor, a distribution of pressure applied to a seat surface of a seat on which the occupant is seated, and determines the posture of the occupant to be a forward leaning posture when the pressure is concentrated on the seat front side, a backward leaning posture when the pressure is concentrated on the seat rear side, a rightward posture when the pressure is concentrated on the seat right side, and a leftward posture when the pressure is concentrated on the seat left side. In addition, the posture determination unit 314 may acquire a captured image of the inside of the own vehicle captured by an in-vehicle camera, extract an image of occupants from the captured image, and determine the posture of each of the occupants.

In a case where the vehicle 10 is predicted to receive an impact, the control determination unit 315 determines, based on the current posture of the occupant and the impact mode, a stimulus application content such that the occupant takes a posture prepared for the impact. For example, when an impact is received from the front side, the right lateral side, or the left lateral side, the posture is changed to allow the body to be inclined to the opposite side to the direction in which the impact is received, that is, allow the body to be oriented in a direction away from the direction in which the impact is input. In addition, in a case where an impact is received from the rear side, the occupant leans forward, and when the distance between the head of the occupant and a headrest is large, the head may possibly hit the headrest with great force in receipt of the impact. Therefore, in a case where an impact is received from the rear side, the occupant is caused to lean rearward, and the posture is changed to bring the head in touch with the headrest. In a case where an impact is received from the front side, the right lateral side, or the left lateral side and the occupant is already in a posture such that the occupant is away from the location where the impact is received, it is not necessary to change the posture; therefore, a control signal need not be output. Furthermore, in a case where an impact is received from the rear side and the occupant is already in a posture with the head in contact with the headrest, it is not necessary to change the posture; therefore, a control signal need not be output. Furthermore, in a case where the strength of the impact is equal to or lower than a predetermined value, a control signal need not be output, that is, the posture need not be changed.

Prior to the impact received by the vehicle 10, the stimulus control unit 316 supplies the control signal to the stimulus application unit in accordance with the timing of receipt of the impact so that the stimulus application unit generates a stimulus in accordance with the control signal to apply the stimulus to the occupant. For example, the stimulus control unit 316 supplies a control signal to the stimulus application unit at a predetermined time before the timing at which the impact is predicted to be received, and changes the posture of the occupant immediately before the impact is received. In addition, when it is determined that the time until the impact is received is short and the posture control cannot be performed in time, a control signal need not be supplied to perform the posture control.

Stimulus Application Unit

Figure 3:
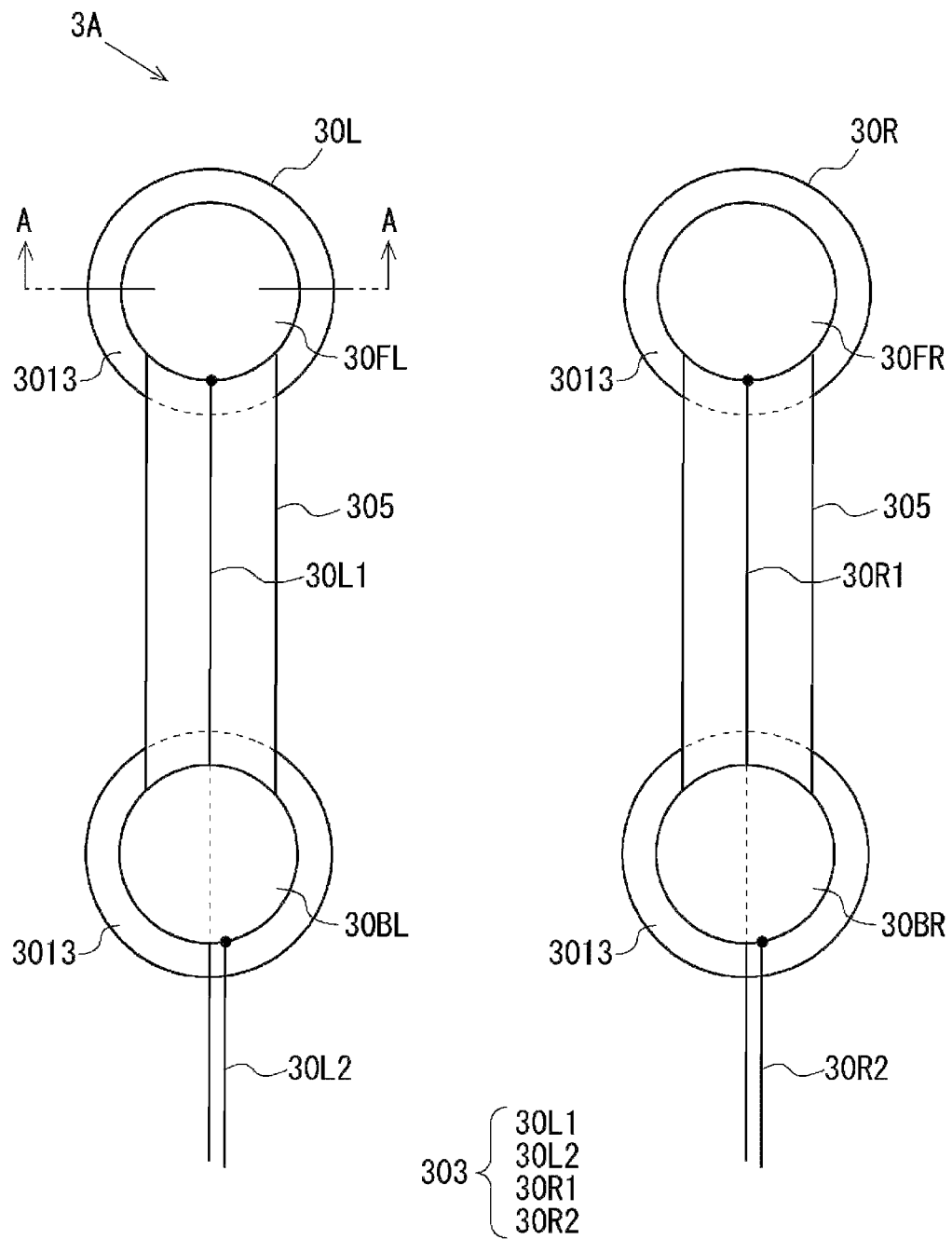
FIG. 3 is a diagram illustrating an example of a stimulus application unit.
Figure 4:
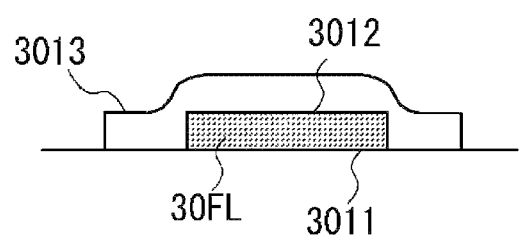
FIG. 4 is a cross-sectional view taken along the line A-A in FIG. 3.
Figure 5:
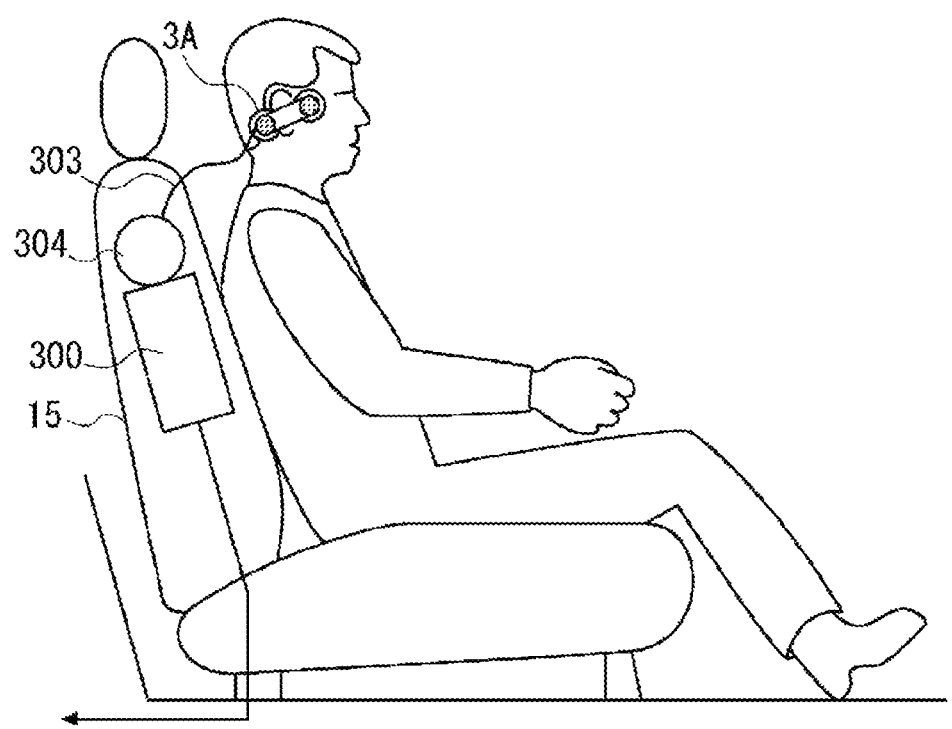
FIG. 5 is a diagram illustrating a state where an occupant wears the stimulus application unit.

FIG. 3 is a diagram illustrating an example of the stimulus application unit 3A, and FIG. 4 is a cross-sectional view taken along the line A-A in FIG. 3. FIG. 5 is a diagram illustrating a state where an occupant wears the stimulus application unit 3A. The stimulus application unit 3A of the present embodiment includes a right-side stimulus application unit 30R to be worn near the right ear of the occupant and a left-side stimulus application unit 30L to be worn near the left ear of the occupant. Since the right-side stimulus application unit 30R and the left-side stimulus application unit are bilaterally symmetrical, only the right-side stimulus application unit 30R is illustrated in FIG. 5 and the left-side stimulus application unit 30L is not illustrated.

The right-side stimulus application unit 30R includes an electrode (a first electrode) 30FR to be worn near the ear of the occupant, that is, in front of the ear, and an electrode (a second electrode) 30BR to be worn behind the ear. The electrodes and 30BR are coupled to each other by a coupling portion 305. Additionally, a cord 30R1 is electrically connected to the electrode 30FR, and a cord 30R2 is electrically connected to the electrode 30BR.

The left-side stimulus application unit 30L includes an electrode 30FL to be worn near the ear of the occupant and in front of the ear, and an electrode 30BL to be worn behind the ear. The electrodes 30FL and 30BL are coupled to each other by a coupling portion 305. Additionally, a cord 30L1 is electrically connected to the electrode 30FL, and a cord 30L2 is electrically connected to the electrode 30BL.

As illustrated in FIG. 4, the electrode 30FL is placed such that one surface (an electrode surface) 3011 is in contact with the skin of the occupant, and a gel sheet 3013 having a larger diameter than the electrode 30FL is adhered to the other surface (a back surface) 3012. Thus, the electrode 30FL is adhered to the skin of the occupant by adhesive force of the gel sheet 3013. Although only the electrode 30FL is illustrated in FIG. 4, the other electrodes 30BL, 30FR, 30BR have the same configuration, and the electrodes 30BL, 30FR, 30BR are adhered to the skin of the occupant by adhesive force of the gel sheet 3013 adhered to the back surface 3012 and bulged circumferentially.

A cord 303 includes the left and right cords 30L1, 30L2 and 30R1, 30R2. The cord 303 is connected via a cord reel 304 to the power supply unit 330 of the control unit 300. The cord reel 304 is provided inside a seat back 15 of the seat and can reel in the cord 303.

It is desirable for the stimulus application unit 3A to be provided for each seat in the vehicle 10; however, the stimulus application unit 3A may be provided only for some seats such as a driver seat and a front passenger seat. Also, although the control unit 300 may be provided in each seat, one control unit 300 may be connected to the stimulus application unit 3A of each seat to control the plurality of stimulus application units 3A.

The stimulus application unit 3A of the present embodiment applies a weak electric current as a stimulus to the vestibular organ of the occupant. When the weak electric current is applied to the vestibular organ by the stimulus application unit 3A, the occupant feels as if acceleration was generated. Normally, when the acceleration is generated, the occupant maintains the posture by reflexively moving the body to cancel out the acceleration. When the occupant feels as if acceleration was generated by an electric stimulus by the stimulus application unit 3A, the acceleration is not actually generated. Accordingly, the body (head) is moved by the motion for trying to cancel out the acceleration, and thus the occupant changes the posture.

Figure 6:
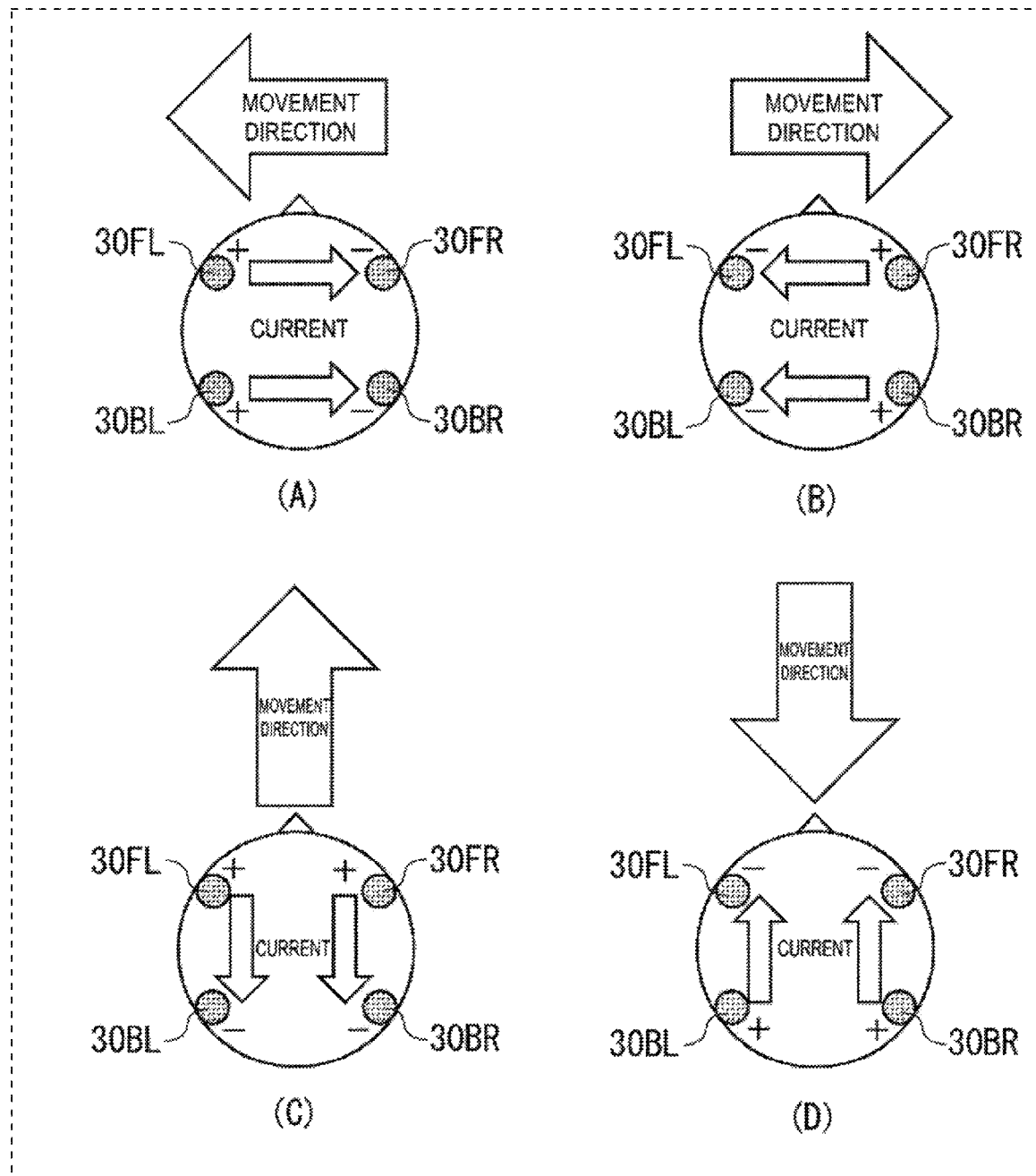
FIG. 6 is a diagram for explaining the operation of the stimulus application unit.

FIG. 6 is a diagram for explaining the operation of the stimulus application unit 3A. As illustrated in FIG. 6 (A), when the electric current flows from the electrodes 30FL, 30BL to the electrodes 30FR, 30BR, the occupant feels as if the acceleration acting from the left to the right was generated, and moves the head to the left to cancel out the acceleration. On the other hand, as illustrated in FIG. 6(B), when the electric current flows from the electrodes 30FR, 30BR to the electrodes 30FL, 30BL, the occupant moves the head to the right.

Additionally, as illustrated in FIG. 6(C), when the electric current flows from the electrodes 30FL, 30FR to the electrodes 30BL, 30BR, the occupant feels as if the acceleration acting from the front to the back was generated, and moves the head to the front to cancel out the acceleration. On the other hand, as illustrated in FIG. 6(D), when the electric current flows from the electrodes 30BL, 30BR to the electrodes 30FR, the occupant moves the head to the back.

The occupant changes the posture in response to the stimulus as just described, and thus, when detecting that an impact is to be received, the occupant protection device 30 applies a stimulus to the occupant to allow the occupant to take a posture prepared for the impact.

Occupant Protection Method

Figure 7:
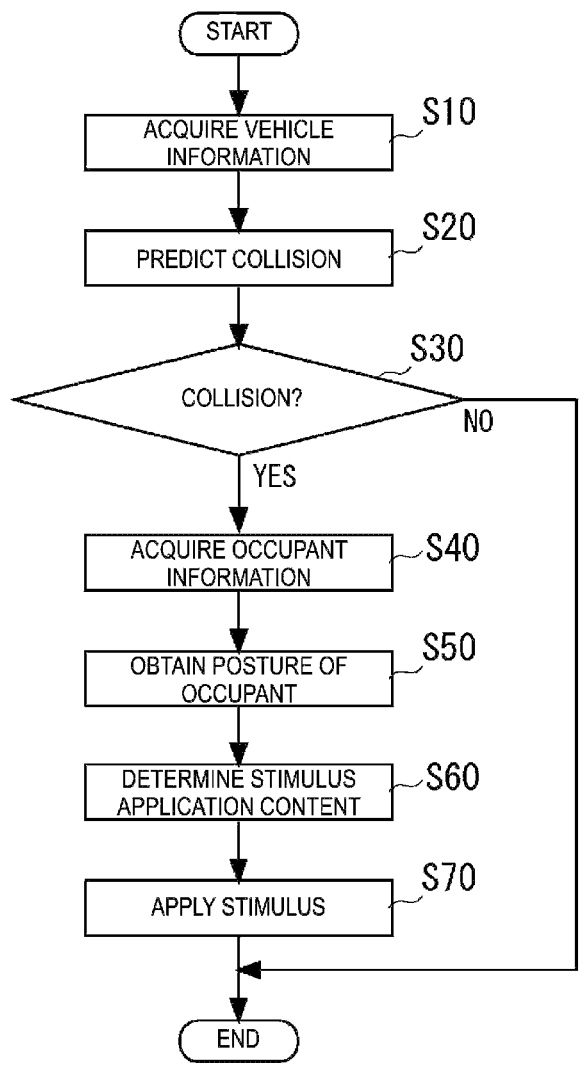
FIG. 7 is a diagram showing a flow of an occupant protection method executed by a controller of the occupant protection device.

FIG. 7 is a diagram showing a flow of an occupant protection method executed by the controller 310 of the occupant protection device 30. The controller 310 repeatedly executes the processing of FIG. 7 while power is supplied to the occupant protection device 30, for example, when an ignition switch of the vehicle 10 is on.

In step S10, the controller 310 acquires, from the sensor 11, information indicating a traveling state of the vehicle 10 and information indicating a situation around the vehicle as vehicle information.

In step S20, the controller 310 predicts an impact on the vehicle 10 based on the vehicle information acquired in step S10.

In step S30, the controller 310 determines whether the impact will occur as a result of the prediction in step S20, and ends the processing of FIG. 7 when a negative determination is made. On the other hand, when an affirmative determination is made in step S30, the controller 310 shifts to step S40.

In step S40, the controller 310 acquires, from the sensor 20, occupant information indicating a state of the occupant in the vehicle 10.

In step S50, the controller 310 obtains, based on the occupant information acquired in step S40, the posture of the occupant at the present moment.

In step S60, the controller 310 determines, based on the impact mode and the current posture of the occupant, the stimulus application content for changing the posture of the occupant to a posture prepared for the impact. For example, in the impact mode such as a collision with an object present in the traveling direction of the own vehicle 10 (a front collision) or a collision with another vehicle or the like from the side (a side collision), the posture of the occupant is controlled such that the body of the occupant, particularly, the head is moved away from the input direction of the impact. Also, in the impact mode in which an impact is received from behind (a rear-end collision), when the occupant leans forward and the distance between the head of the occupant and the headrest is large, the head may possibly hit the headrest with great force in receipt of the impact. Therefore, in a case where an impact is received from behind, the occupant is caused to lean rearward, and the posture is changed to bring the head close to the headrest.

In step S70, the controller 310 sends a control signal to the power supply unit 330, supplies an electric current to the stimulus application unit 3A in accordance with the timing of receipt of the impact, and causes the stimulus application unit 3A to apply an electric stimulus to the occupant.

As described above, according to the present embodiment, when the own vehicle 10 is predicted to collide with another vehicle or an obstacle and receive an impact, control is performed such that the occupant is stimulated to take a posture prepared for the impact before receiving the impact, thereby improving occupant protection performance. In particular, in the present embodiment, since the stimulus application unit 3A is worn by the occupant, the stimulus can be applied regardless of the seating posture of the occupant or the state of clothing of the occupant. Therefore, the posture of the occupant can be appropriately controlled, and the occupant protection performance can be improved. In the present embodiment, calculations of S10 and S20 are performed for S30 prior to calculations of S40 and S50, but not limited thereto. For example, S10 and S20, and S40 and S50 may be constantly calculated, and when it is determined in step S30 that a collision is unavoidable, the processing may proceed to S60 in accordance with the result obtained in S50.

Second Embodiment

Figure 8:
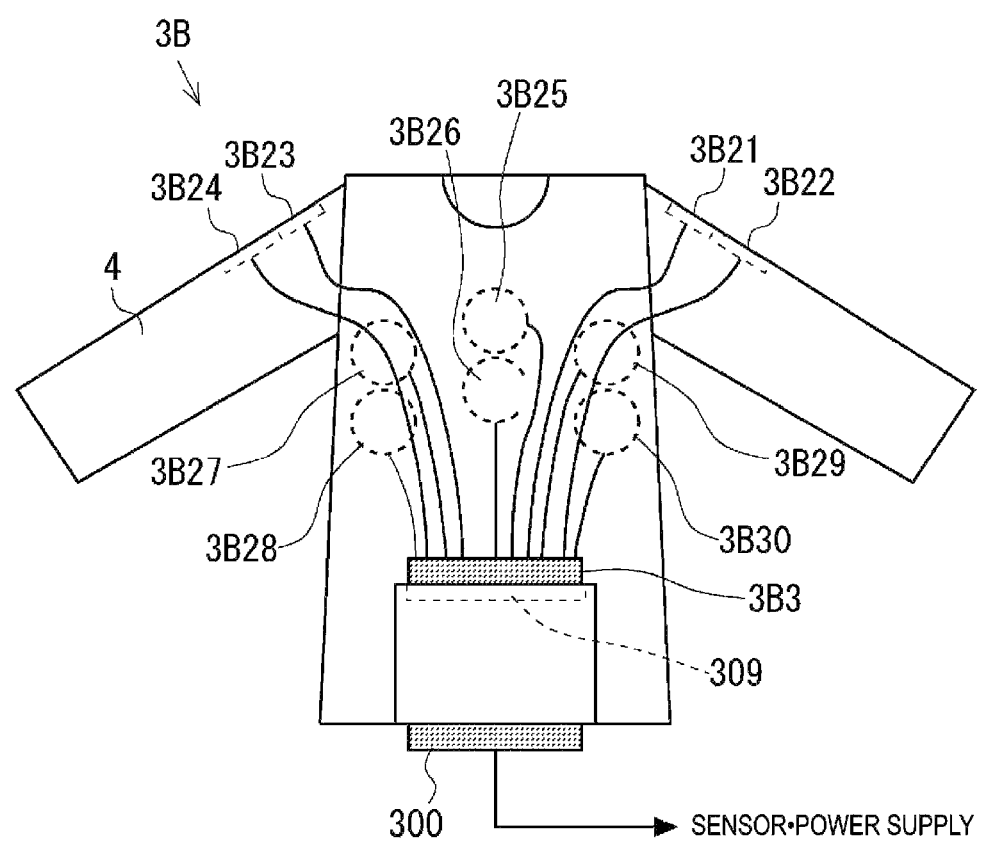
FIG. 8 is a diagram illustrating a stimulus application unit according to a second embodiment.

FIG. 8 is a diagram illustrating a stimulus application unit 3B according to a second embodiment. The present embodiment is different from the aforementioned first embodiment in the configuration of the stimulus application unit 3B, and the other configurations are the same as those of the first embodiment. Accordingly, the same elements as those of the aforementioned embodiment are denoted by the same reference numerals or the like and the description thereof will not be repeated. In the present embodiment, dedicated clothing (suit) 4 as an example of a wearing unit is provided with electrodes 3B21 to 3B30 as the stimulus application unit 3B and the control unit 300. The electrodes 3B21 to 3B30 have the same configuration as that of the electrode in FIG. 4, are adhered to an inner surface of the clothing 4 by the gel sheet 3013, and are adhered to the skin of an occupant wearing the clothing 4. In the example of FIG. 8, the electrodes 3B21, 3B22 are arranged in contact with the left upper arm, the electrodes 3B23, 3B24 are arranged in contact with the right upper arm, and the electrodes 3B25, 3B26 are arranged in contact with the chest. Also, the electrodes 3B27, 3B28 are arranged in contact with the right side portion of the back, and the electrodes 3B29, 3B30 are arranged in contact with the left side portion of the back. Each of the electrodes 3B21 to 3B30 is connected via a cord to the power supply unit 330 of the control unit 300. Each of the electrodes 3B21 to 3B30 and the control unit 300 are attachable to and detachable from the clothing 4, and the clothing 4 can be washed by detaching the electrodes 3B21 to 3B30 and the control unit 300. The cord of each of the electrodes 3B21 to 3B30 is connected to a coupler 3B3, and the coupler 3B3 is connected to a coupler 309 on the control unit 300 side. Thus, the plurality of electrodes 3B21 to 3B30 can be collectively connected to the control unit 300. As a result, an error in connection between each of the electrodes 3B21 to 3B30 and the control unit 300 can be prevented, and a stimulus can be reliably applied to a predetermined portion of the occupant.

As in the first embodiment described above, when predicting that an impact will be received, the control unit 300 causes at least one of the electrodes 3B21 to 3B30 to operate to apply an electric stimulus to the occupant and control the posture of the occupant. For example, when the electric current flows through the electrodes 3B21 to 3B24 in contact with the upper arms, the arms contract and move so as to be pulled toward the body. As a result, the occupant is controlled to take a posture prepared for the impact.

Figure 9:
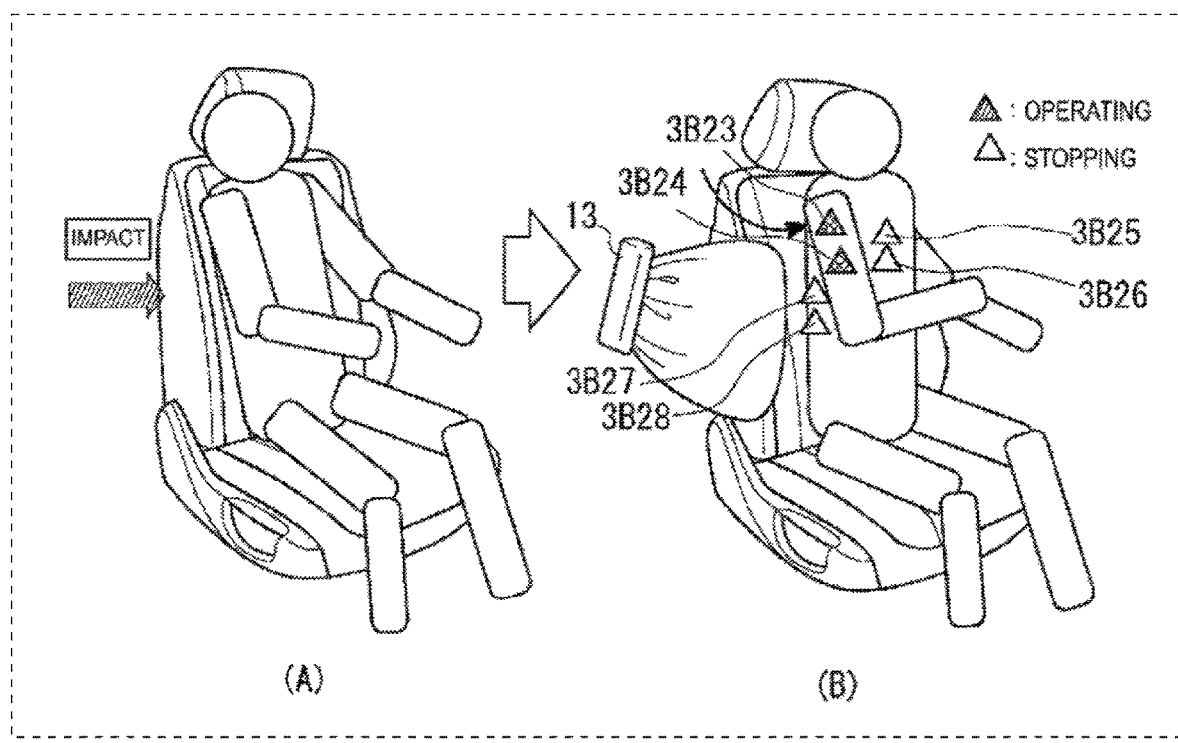
FIG. 9 is a diagram for explaining the operation at the time of impact in the second embodiment.

FIG. 9 is a diagram for explaining the operation at the time of impact in the second embodiment. As illustrated in FIG. 9(A), when an occupant is seated on the right side seat in the vehicle 10 and the controller 310 of the control unit 300 predicts that an impact will be received from the right side of the occupant, the electrodes 3B29, 3B30 apply an electric stimulus to contract the dorsal muscles of the left upper body of the occupant and move (incline) the upper body to the left side. Accordingly, the occupant can be kept away from the direction in which the impact is input, and a space in which the airbag is deployed can be secured as illustrated in FIG. 9(B), and thus the occupant protection performance can be improved. In the present embodiment, other than the suit 4, the wearing unit may be formed in a belt shape and used with it wound around a necessary portion of the occupant. In addition, the wearing unit may be clothing other than the suit 4, such as a hat, gloves, a vest (waistcoat), trousers, or socks, or an accessory such as a helmet, a choker, glasses, headphones, a wristwatch, or an anklet.

Third Embodiment

Figure 10:
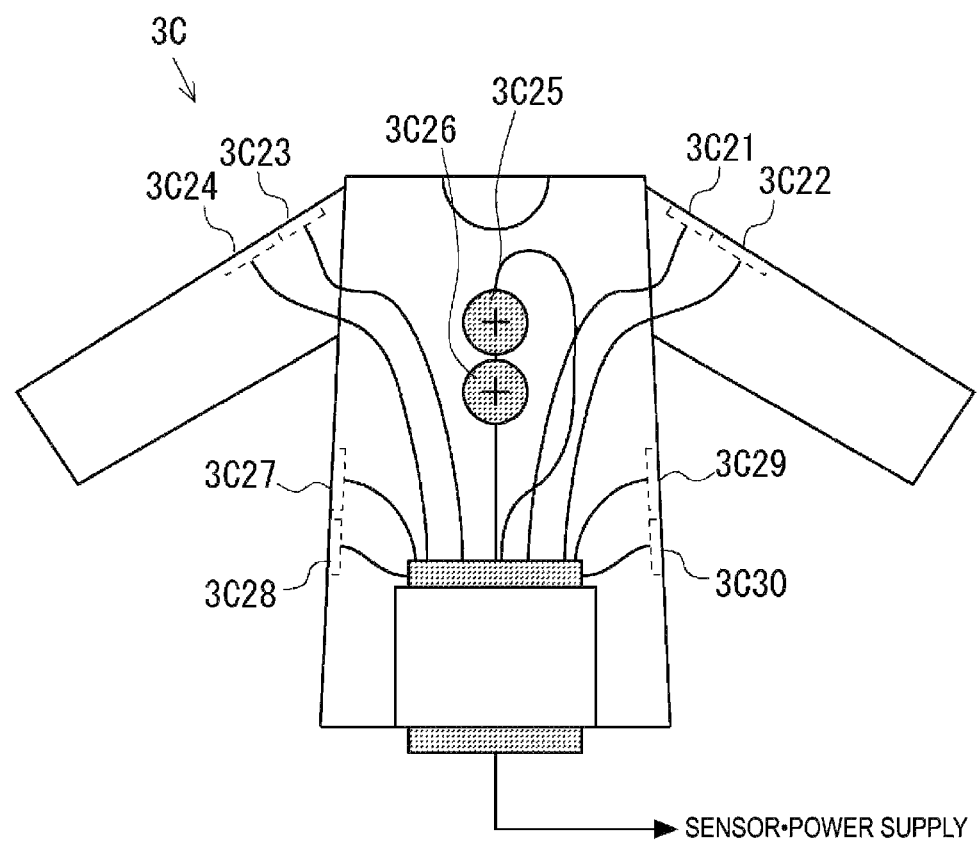
FIG. 10 is a diagram illustrating a stimulus application unit according to a third embodiment.

FIG. 10 is a diagram illustrating a stimulus application unit 3C according to a third embodiment. The present embodiment is different from the aforementioned second embodiment in the configuration of the stimulus application unit 3C, and the other configurations are the same as those of the second embodiment. Accordingly, the same elements as those of the aforementioned embodiment are denoted by the same reference numerals or the like and the description thereof will not be repeated.

Figure 11:
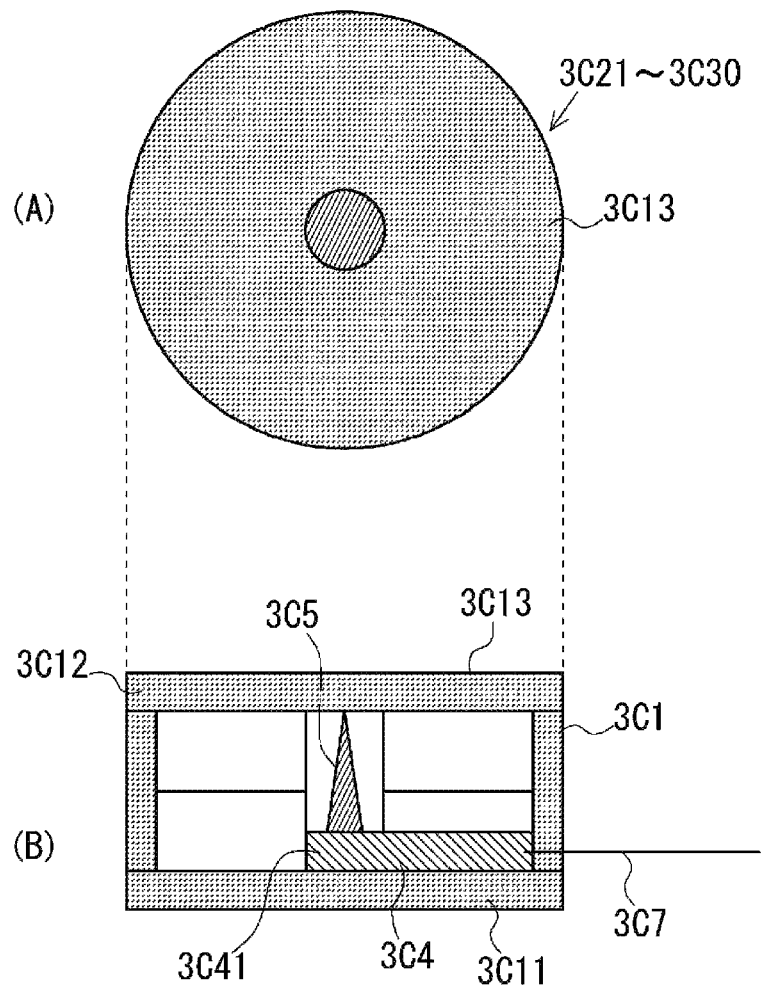
FIG. 11 is a diagram illustrating the configuration of a pad.

In the present embodiment, the dedicated clothing (suit) 4 is provided with pads 3C21 to 3C30 as the stimulus application unit 3C and the control unit 300. In the example of FIG. 10, the pads 3C21, 3C22 are arranged in contact with the left upper arm, the pads 3C23, 3C24 are arranged in contact with the right upper arm, and the pads 3C25, 3C26 are arranged in contact with the chest. Also, the pads 3C27, 3C28 are arranged in contact with the right flank, and the pads 3C29, 3C30 are arranged in contact with the left flank. FIG. 11 is a diagram illustrating the configuration of the pads 3C21 to 3C30. As illustrated in FIG. 11(A), each of the pads 3C21 to 3C30 includes a drive portion 3C4 and a needle 3C5 in an enclosure 3C1 having a planar circular shape. For each of the pads 3C21 to 3C30, an outer surface of a back plate portion 3C11 of the enclosure 3C1 is adhered to the clothing 4. An adhesive tape 3C13 is provided on an outer surface of a contact plate portion 3C12 located on the opposite side of the back plate portion 3C11 of the enclosure 3C1, and an adhesive tape 3C13 is adhered to the skin of the occupant.

The drive portion 3C4 is connected via a cord 3C7 to the power supply unit 330 of the control unit 300 and is fed with power during operation. The drive portion 3C4 is a bimetal that is formed in a flat plate shape by combining two types of metals having different thermal expansion coefficients. The drive portion 3C4 generates heat when the operating electric current is applied by the power supply unit 330 and changes its shape due to the difference in thermal expansion coefficient. One end of the drive portion 3C4 is fixed to a peripheral portion of the back plate portion 3C11 of the enclosure 3C1, and the other end (an operating end) 3C41 is disposed near the center of the enclosure 3C1. The drive portion 3C4 has a flat plate shape along the back plate portion 3C11 in a state before operation. The drive portion 3C4 is curved such that the operating end 3C41 is brought close to the contact plate portion 3C12 side when heat is generated by the operating electric current. The needle 3C5 is disposed on the contact plate portion 3C12 side of the operating end 3C41, and the entire needle 3C5 is accommodated in the enclosure 3C1 before the drive portion 3C4 operates. Meanwhile, when the drive portion 3C4 operates and the operating end 3C41 moves to the contact plate portion 3C12 side, the tip end of the needle 3C5 projects from the enclosure 3C1. As a result, when each of the pads 3C21 to 3C30 operates, the needle 3C5 thrusts the skin of the occupant and applies a stimulus to the occupant.

The occupant to which a stimulus (pain) is applied by the pads 3C21 to 3C30 moves the body in a direction in which the occupant escapes from the pain, due to nociceptive reflex. When predicting that an impact will be received, the controller 310 controls, utilizing this reaction, the occupant such that the occupant takes a posture prepared for the impact. In addition, when activating the pads 3C21 to 3C30, the controller 310 may stop the operating electric current a predetermined time after the activation. As a result, the drive portion 3C4 is cooled and returns to the flat plate shape seen before activation, and the needle 3C5 is accommodated in the enclosure 3C1.

Figure 12:
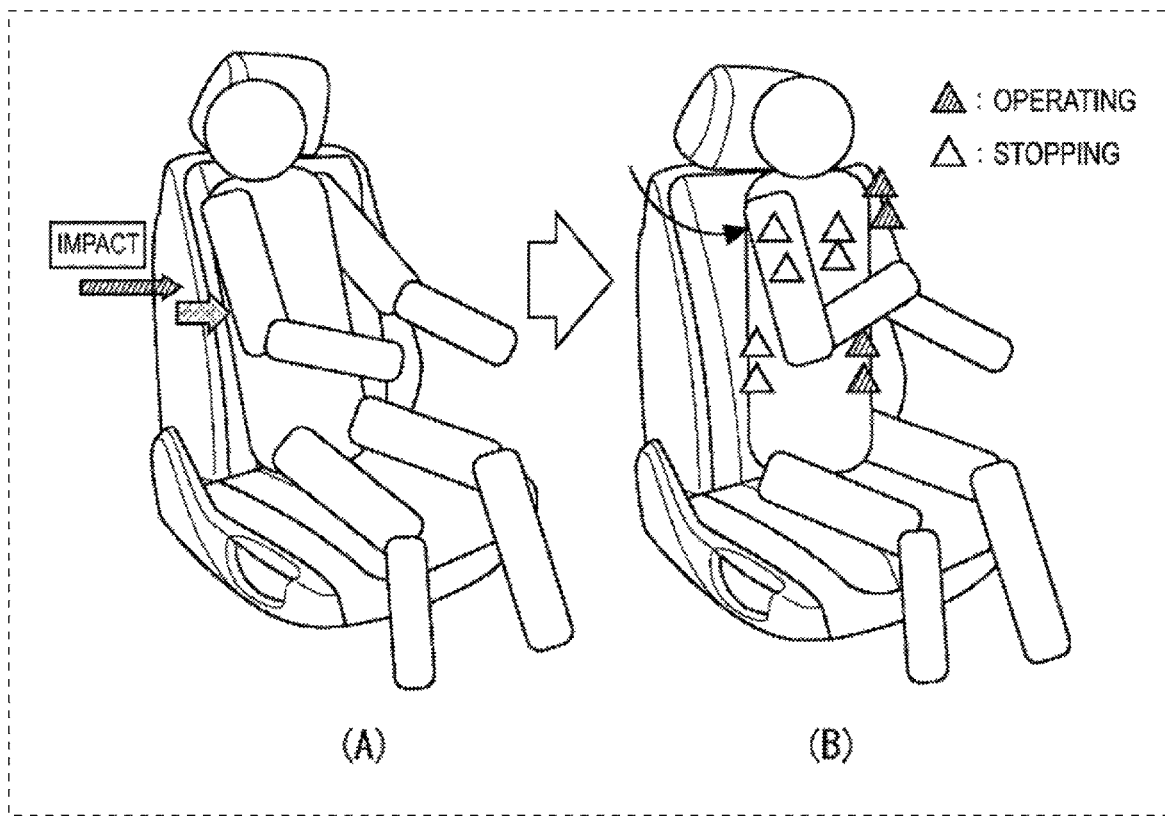
FIG. 12 is a diagram for explaining the operation at the time of impact in the third embodiment.

FIG. 12 is a diagram for explaining the operation at the time of impact in the third embodiment. As illustrated in FIG. 12(A), when the occupant is seated on the right side seat in the vehicle 10 and the controller 310 of the control unit 300 predicts that an impact will be received from the right side of the occupant, the pads 3C21, 3C22, 3C29, 3C30 apply an electric stimulus to the occupant to move (incline) the upper body to the left side. Accordingly, as illustrated in FIG. 12(B), the occupant can be kept away from a location where the impact is received, and thus the occupant protection performance can be improved.

First Modification

Figure 13:
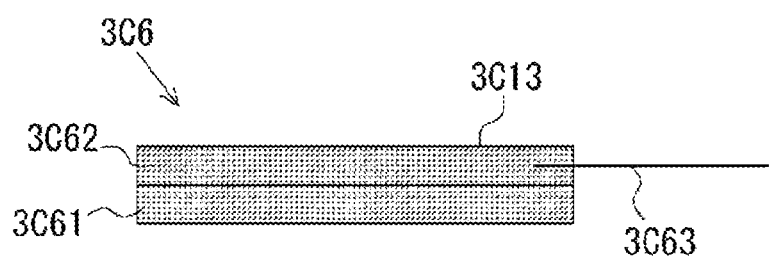
FIG. 13 is a diagram illustrating the configuration of a pad according to a first modification.

FIG. 13 is diagram illustrating the configuration of a pad according to a first modification. The present embodiment is different from the aforementioned third embodiment in the configuration of a pad 3C6 of the stimulus application unit 3C, and the other configurations are the same as those of the third embodiment. In the aforementioned third embodiment, each of the pads 3C21 to 3C30 gives, as a stimulus, a pain caused by thrust with the needle 3C5. Instead, in the present modification, the pad 3C6 is used to apply heat from a heating sheet, as a stimulus.

The pad 3C6 includes a heating sheet 3C62 on the contact surface side of a substrate 3C61. The heating sheet 3C62 is connected via a cord 3C63 to the power supply unit 330 of the control unit 300 and receives an operating electric current from the power supply unit 330 during operation.

The pad 3C6 is disposed such that an outer surface of the substrate 3C61 is adhered to the clothing 4 and a surface of the heating sheet 3C62 on the opposite side to the substrate 3C61 is in contact with the skin of the occupant.

When predicting that an impact will be received, the controller 310 supplies an operating electric current to the pad 3C6 to cause the heating sheet 3C62 to generate heat and apply the heat to the occupant as a stimulus. In addition, other processing such as determination of a control signal is the same as that in the third embodiment. According to the present modification, the posture of the occupant is controlled by a thermal stimulus in a manner similar to that in the aforementioned embodiment, and thus the occupant can be protected.

Fourth Embodiment

Figure 14:
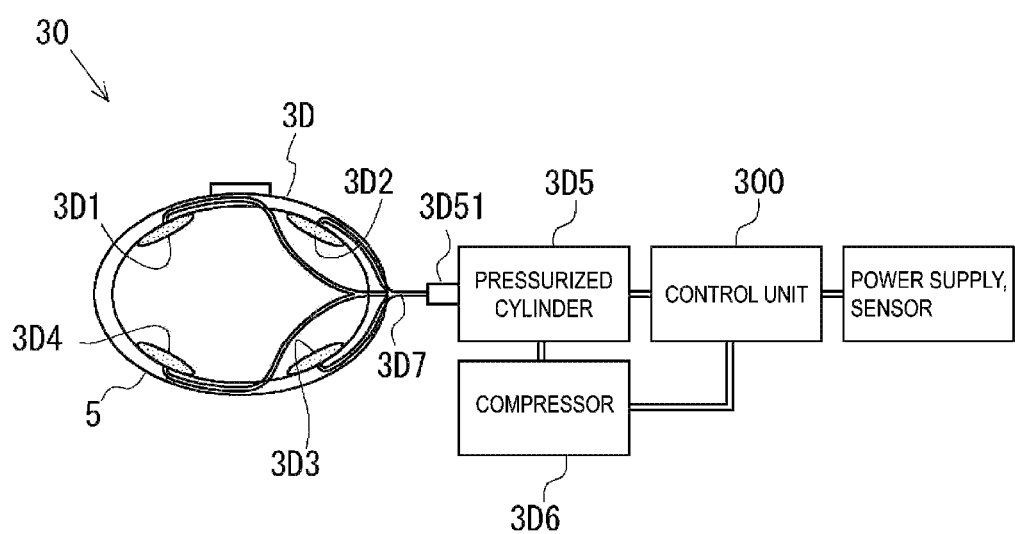
FIG. 14 is a diagram illustrating the configuration of the occupant protection device provided with a stimulus application unit according to a fourth embodiment.
Figure 15:
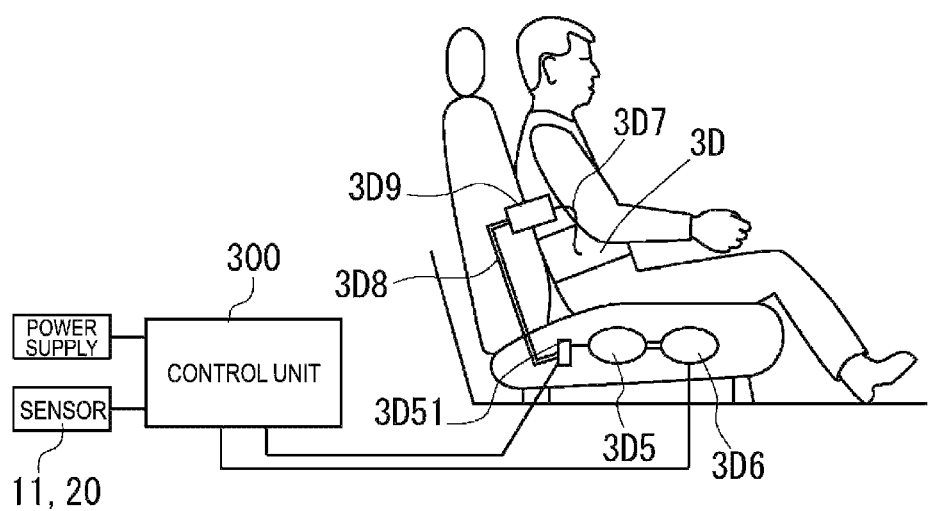
FIG. 15 is a diagram illustrating a state where the stimulus application unit according to the fourth embodiment is worn.

FIG. 14 is a diagram illustrating the configuration of the occupant protection device 30 including a stimulus application unit 3D according to a fourth embodiment, and FIG. 15 is a diagram illustrating a state where the stimulus application unit 3D according to the fourth embodiment is worn. The present embodiment is different from the aforementioned first to third embodiments in the configuration of the stimulus application unit 3D, and the other configurations are the same as those of the first to third embodiments. Accordingly, the same elements as those of the aforementioned embodiments are denoted by the same reference numerals or the like and the description thereof will not be repeated.

In the present embodiment, a belt-shaped stimulus application unit main body is provided with balloon portions 3D1 to 3D4 as the stimulus application unit 3D. In the example of FIG. 14, the balloon portion 3D1 is disposed in contact with the left abdomen, the balloon portion 3D2 is disposed in contact with the right abdomen, the balloon portion 3D3 is disposed in contact with the right side portion of the waist, and the balloon portion 3D4 is disposed in contact with the left side portion of the waist. Additionally, the occupant protection device 30 according to the present embodiment includes a pressurized cylinder 3D5 and a compressor 3D6 instead of the power supply unit 330 described above.

Each of the balloon portions 3D1 to 3D4 is connected via an air tube 3D7 to the pressurized cylinder 3D5. The pressurized cylinder 3D5 can supply air to the balloon portions 3D1 to 3D4 in response to a control signal received from the control unit 300 and inflate each of the balloon portions 3D1 to 3D4. Note that the pressurized cylinder 3D5 can separately supply air to each of the balloon portions 3D1 to 3D4 by controlling, in response to the control signal, opening and closing of a valve 3D51 provided for the air tube 3D7 connected to each of the balloon portions 3D1 to 3D4.

As illustrated in FIG. 15, the stimulus application unit 3D is worn by winding the stimulus application unit main body 5 around a portion near the waist of an occupant. The pressurized cylinder 3D5 and the compressor 3D6 according to the present embodiment are provided in the seat, and the air tube 3D7 connected to the balloon portions 3D1 to 3D4 of the stimulus application unit 3D and an air tube 3D8 connected to the pressurized cylinder 3D5 are connected to each other via a coupler 3D9. The compressor 3D6 replenishes the pressurized cylinder 3D5 with air such that air pressure in the pressurized cylinder 3D5 reaches a predetermined value or higher, to enable the air to be quickly supplied from the pressurized cylinder 3D5 to the stimulus application unit 3D.

In a state where the stimulus application unit main body 5 is worn by the occupant, the controller 310 sends a control signal for activating the stimulus application unit 3D to the pressurized cylinder 3D5 (valve 3D51) and the pressurized cylinder 3D5 supplies air to the balloon portions 3D1 to 3D4. Accordingly, the balloon portions 3D1 to 3D4 inflate between the stimulus application unit main body and the body surface of the occupant, and thus pressure (a stimulus) is applied to the body surface of the occupant. In addition, an exhaust port (vent hole) that is not illustrated is provided at each of the balloon portions 3D1 to 3D4, and the supplied air is exhausted at a predetermined speed. Therefore, when the supply of air from the pressurized cylinder 3D5 is stopped, the air may be exhausted to return the balloon portion to a non-pressurizing state. Moreover, an exhaust valve may be attached to the valve 3D51, and the exhaust valve may be opened in response to a signal from the control unit to exhaust the air in each of the balloon portions 3D1 to 3D4.

Figure 16:
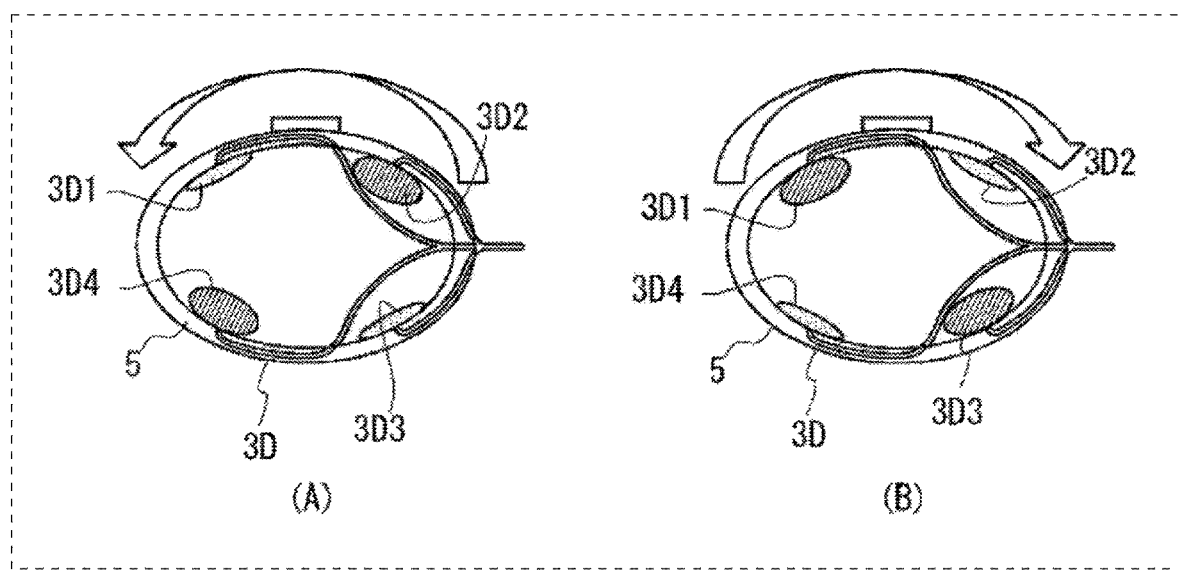
FIG. 16 is a diagram for explaining the operation at the time of impact in the fourth embodiment.

FIG. 16 is a diagram for explaining the operation at the time of impact in the fourth embodiment. As illustrated in FIG. 16(A), in the present embodiment, the balloon portions 3D1 to 3D4 are arranged on four sides of the occupant on a horizontal plane. When the balloon portions 3D2, 3D4 located at diagonal positions of a quadrangle having vertexes corresponding to the positions of the balloon portions 3D1 to 3D4 are activated, the occupant moves by the Hanger reflex such that the muscles to which pressure is applied from the balloon portions 3D2, 3D4 contract, and changes the posture to twist the upper body to the left.

On the other hand, as illustrated in FIG. 16(B), when the balloon portions 3D1, 3D3 are activated, the occupant changes the posture by the Hanger reflex to twist the upper body to the right. By utilizing the Hanger reflex, when predicting that an impact will be received from the right side, the controller 310 causes the balloon portions 3D2, 3D4 to operate and thus controls the posture such that the upper body is twisted to the left, and when predicting that an impact will be received from the left side, the controller 310 causes the balloon portions 3D1, 3D3 to operate and thus controls the posture such that the upper body is twisted to the right. As a result, the occupant is kept away from the location where the impact is received, and thus the occupant protection performance can be improved.

Additionally, in the present embodiment, the air is supplied from the pressurized cylinder 3D5 to each of the balloon portions 3D1 to 3D4. However, the pressurized cylinder 3D5 may be omitted, and the air may be supplied from the compressor 3D6 to each of the balloon portions 3D1 to 3D4. Furthermore, an igniter may be used instead of the pressurized cylinder 3D5 and the compressor 3D6, and the air expanded when powder is ignited by the igniter may be supplied to the balloon portions 3D1 to 3D4. Furthermore, by supplying a gas generated by a gas generator to the balloon portions 3D1 to 3D4, the balloon portions 3D1 to 3D4 may be inflated.

Fifth Embodiment

Figure 17:
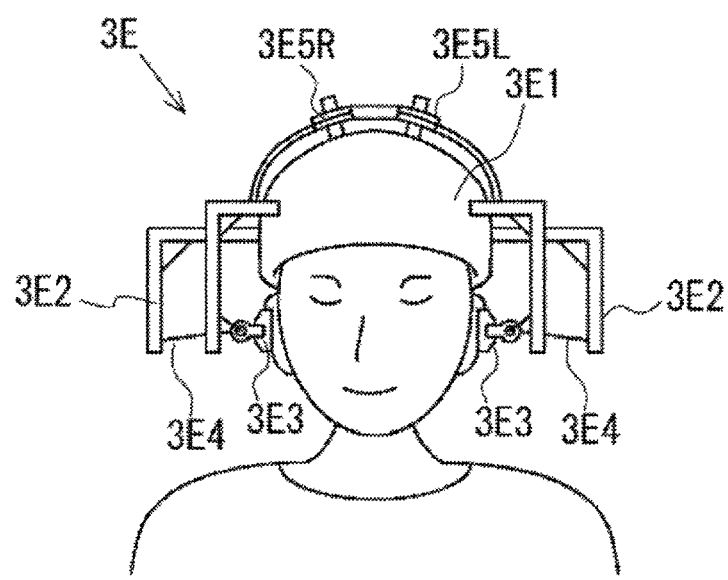
FIG. 17 is a diagram illustrating a stimulus application unit according to a fifth embodiment.
Figure 17:
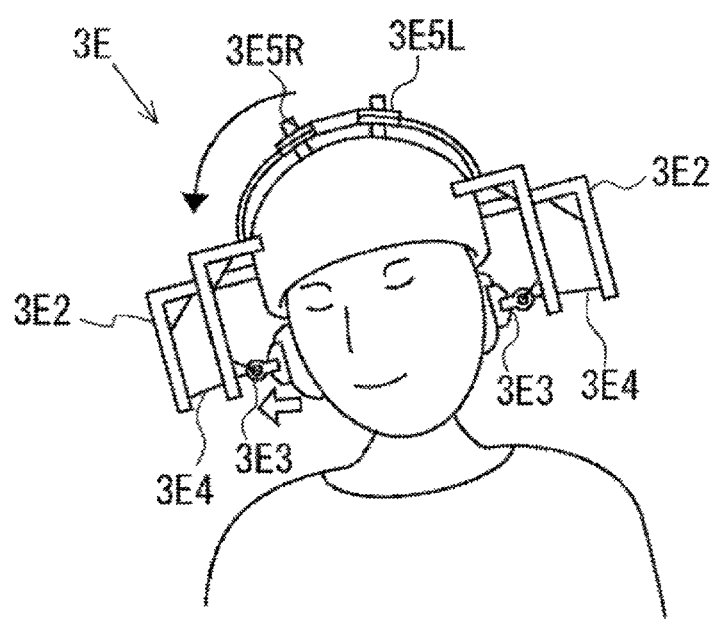

FIG. 17 is a diagram illustrating a stimulus application unit 3E according to a fifth embodiment. The present embodiment is different from the aforementioned first embodiment in the configuration of the stimulus application unit 3E, and the other configurations are the same as those of the first embodiment. Accordingly, the same elements as those of the aforementioned embodiment are denoted by the same reference numerals or the like and the description thereof will not be repeated.

The stimulus application unit 3E of the present embodiment includes a helmet 3E1, frame portions 3E2, pulling portions 3E3, wires 3E4, and winding portions (actuators) 3E5L, 3E5R.

The frame portions 3E2 are attached on the left and right sides of the helmet 3E1 such that the frame portions 3E2 are located on the outer side of the left and right ears when an occupant wears the helmet 3E1. The pulling portions 3E3 are attached to the ear auricles of the occupant, and are each a member for pulling the corresponding ear auricle. One end of the wire 3E4 is connected to the corresponding pulling portion 3E3, and the other end of the wire 3E4 is connected to the corresponding winding portion 3E5L or 3E5R via a pulley (not illustrated) provided on the corresponding frame portion 3E2.

The winding portions 3E5L, 3E5R are each an actuator that winds in or lets out the corresponding wire 3E4 in response to a control signal. When the winding portion 3E5L, 3E5R winds in the corresponding wire 3E4 in a state where the stimulus application unit 3E is worn by the occupant, the wire 3E4 pulls the corresponding pulling portion 3E3 in the direction of the pulley provided on the corresponding frame portion 3E2 and pulls the ear auricle of the occupant in this direction, that is, outward in the left-right direction of the occupant. When the ear auricle is pulled in this way, the upper body of the occupant is inclined in the direction in which the ear auricle is pulled. For example, when the winding portion 3E5R winds in the wire 3E4 on the right ear side and pulls the right ear of the occupant, the occupant changes the posture to incline the upper body to the right side as illustrated in FIG. 17(B). By utilizing this reaction, when predicting that an impact will be received from the right side, the controller 310 causes the winding portion 3E5L on the left side to operate to pull the left ear auricle and thus controls the posture such that the upper body is inclined to the left, and when predicting that an impact will be received from the left side, the controller 310 causes the winding portion 3E5R on the right side to operate to pull the right ear auricle and thus controls the posture such that the upper body is inclined to the right. As a result, the occupant is kept away from the location where the impact is received, and thus the occupant protection performance can be improved.

Second Modification

Figure 18:
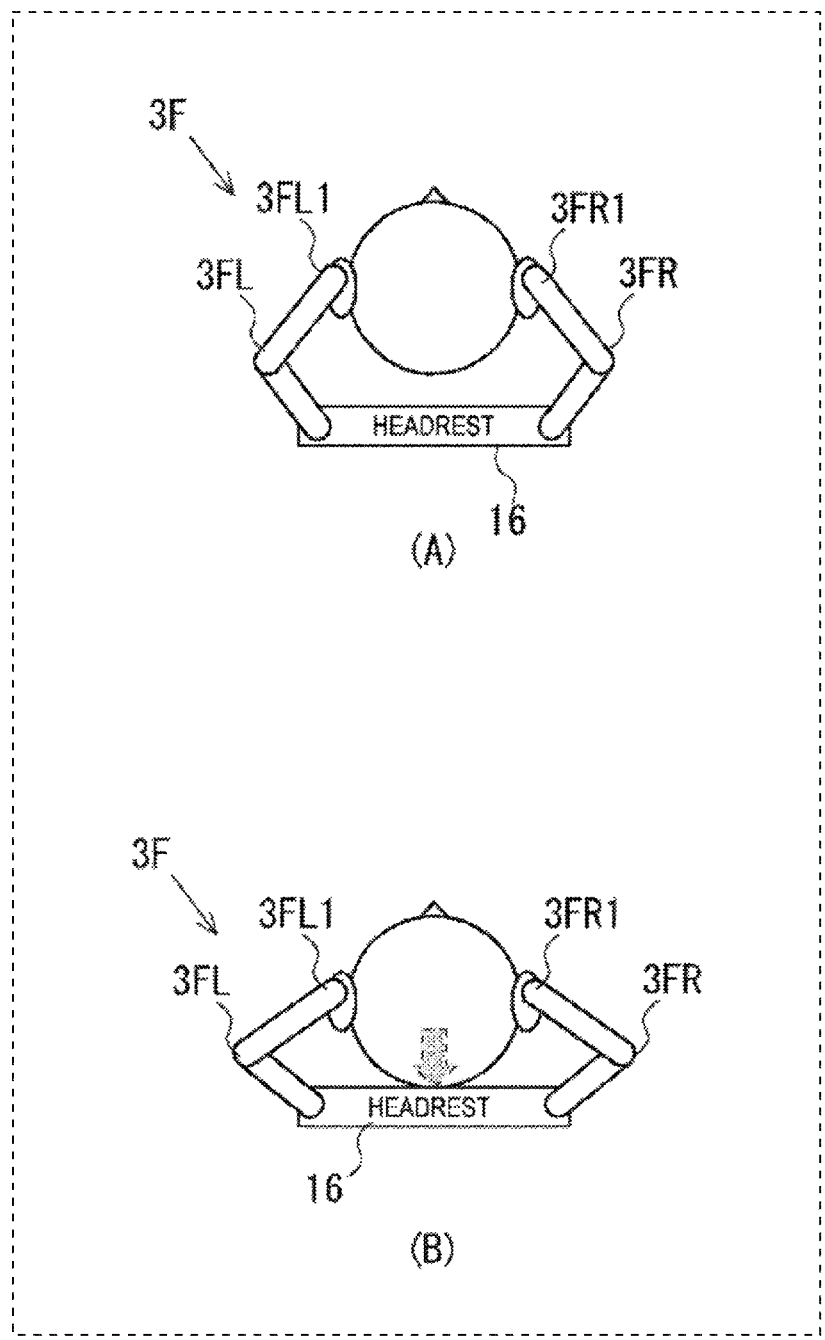
FIG. 18 is a diagram illustrating the configuration of a stimulus application unit according to a second modification.

FIG. 18 is a diagram illustrating the configuration of a stimulus application unit 3F according to a second modification. The present modification is different from the aforementioned fifth embodiment in the configuration of the stimulus application unit 3F, and the other configurations are the same as those of the fifth embodiment.

The stimulus application unit 3F includes a pair of left and right arm portions 3FL, 3FR. One end portion of each of the arm portions 3FL, 3FR is fixed to a headrest 16 of the seat, and the other end portion 3FL1, 3FR1 is connected to the corresponding ear auricle of an occupant. The arm portions 3FL, 3FR can move the end portions 3FL1, 3FR1 forward, rearward, leftward, and rightward in response to a control signal, and thus a stimulus for pulling each of the ear auricles can be applied to the occupant.

When predicting that an impact will be received from the rear side, as illustrated in FIG. 18(B), the controller 310 moves the end portions 3FL1, 3FR1 rearward to pull the ear auricles rearward and thus controls the posture to bring the head of the occupant close to the headrest 16. As a result, a distance between the headrest 16 and the head can be reduced when the impact is applied from the rear side, and thus the occupant protection performance can be improved.

Sixth Embodiment

Figure 19:
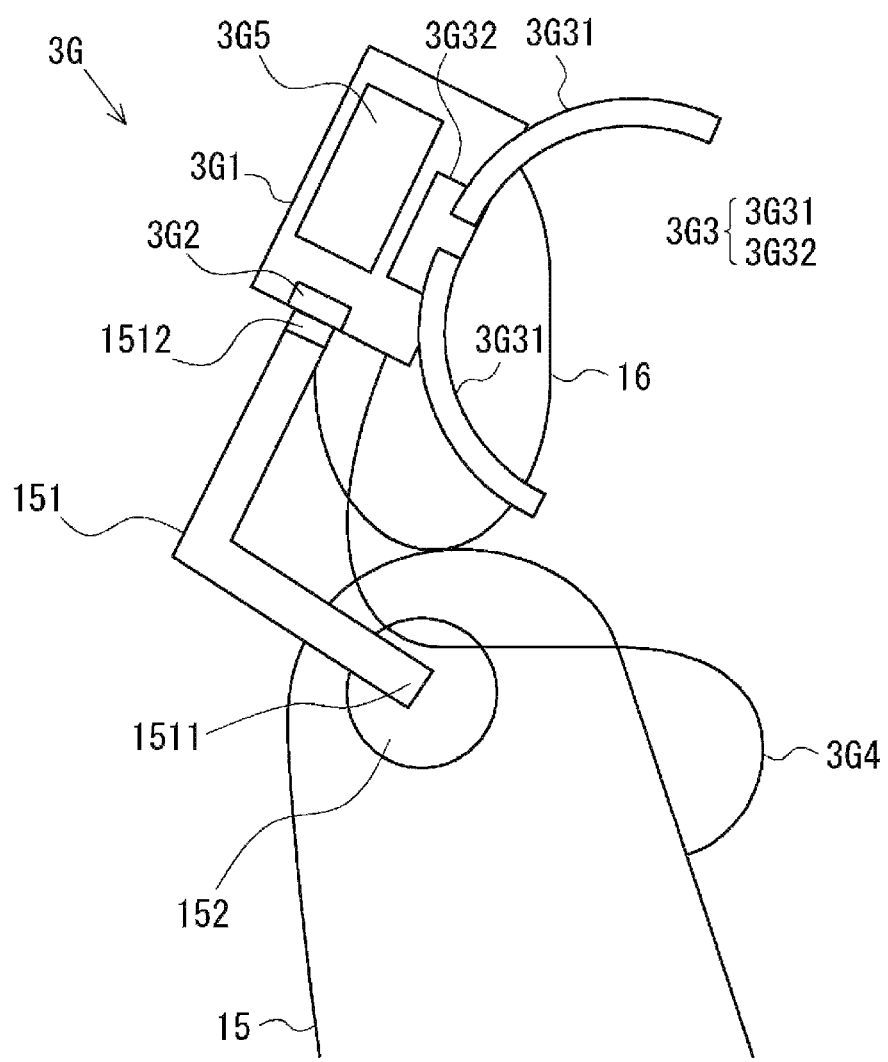
FIG. 19 is a diagram illustrating a stimulus application unit according to a sixth embodiment.

FIG. 19 is a diagram illustrating a stimulus application unit 3G according to a sixth embodiment. The present embodiment is different from the aforementioned first embodiment in the configuration of the stimulus application unit 3G, and the other configurations are the same as those of the first embodiment. Accordingly, the same elements as those of the aforementioned embodiment are denoted by the same reference numerals or the like and the description thereof will not be repeated.

The stimulus application unit 3G is configured to apply a stimulus by vibration to an occupant. The stimulus application unit 3G before the occupant is seated (when not in use) is held by the seat back 15 of the seat, and is automatically worn by the user when the occupant is seated.

A support portion 151 is an arm-shaped member that supports the stimulus application unit 3G such that it is located above the seat back 15 when not in use. A base end portion 1511 of the support portion 151 is born by a rotary drive portion 152 embedded in an upper end portion of the seat back 15 and on each side of the headrest 16, and the support portion 151 is driven to rotate about the base end portion 1511. A magnet 1512 is provided at a tip end of the support portion 151.

The stimulus application unit 3G includes an electromagnet 3G2 using an iron core on a side surface of an enclosure 3G1, and includes a grip portion 3G3 for gripping the shoulder of the occupant to allow the stimulus application unit 3G to be worn by the occupant, on a lower surface side of the enclosure 3G1. The grip portion 3G3 includes a pair of arc-shaped members 3G31 and an opening/closing drive portion 3G32 that rotatably holds upper ends of the arc-shaped members 3G31 and drives the arc-shaped members 3G31 to open and close the lower end side thereof. Additionally, the grip portion 3G3 is electrically connected via a cord 3G4 to the control unit 300.

The electromagnet 3G2 receives power supplied from the power supply unit 330 of the control unit 300 to generate magnetic force. When the stimulus application unit 3G is not in use, the iron core of the electromagnet 3G2 is attracted to the magnet 1512 of the support portion 151, and thus the stimulus application unit 3G is attached to the tip end of the support portion 151.

Figure 20:
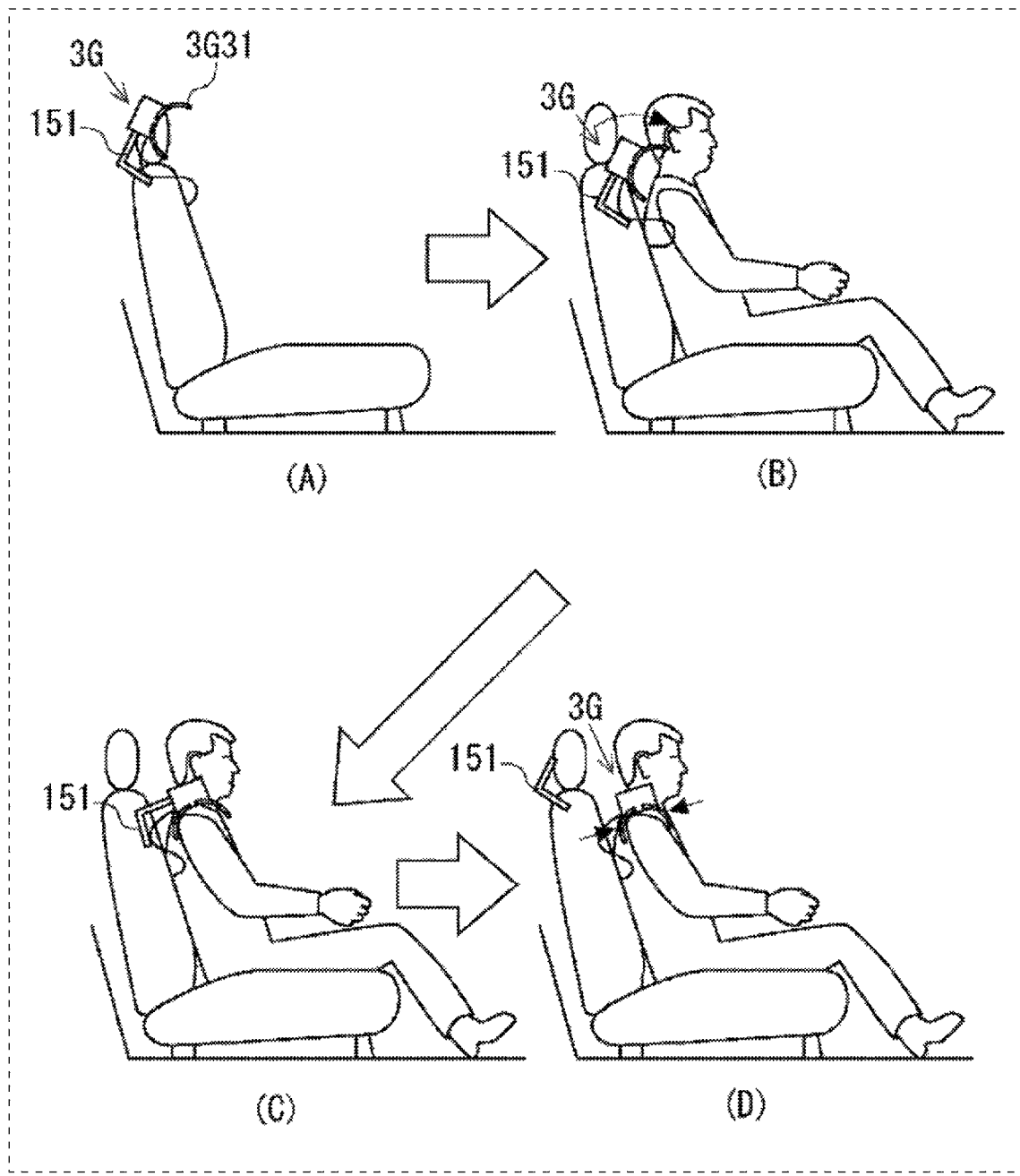
FIG. 20 is an explanatory diagram of the operation of allowing the stimulus application unit to be worn on the shoulder of an occupant.

FIG. 20 is explanatory diagram of the operation of allowing the stimulus application unit 3G to be worn on the shoulders of the occupant with the stimulus application unit 3G. Before the occupant is seated, as illustrated in FIG. 20(A), the stimulus application unit 3G is supported by the support portion 151 in a state where the arc-shaped members 3G31 are opened. When a pressure sensor (seat sensor) of the seat detects that the occupant is seated, the controller 310 rotates the support portion 151 toward the occupant side as illustrated in FIG. 20(B). Then, as illustrated in FIG. when the stimulus application unit 3G comes into contact with the shoulder of the occupant and the rotation stops, the controller 310 controls the opening/closing drive portion 3G32 to close the arc-shaped members 3G31 and grip the shoulder of the occupant, and thus the stimulus application unit 3G is worn on each shoulder of the occupant. After that, the controller 310 supplies power to the electromagnet 3G2 to generate a magnetic force such that the electromagnet 3G2 has the same polarity as the magnet 1512 and repels the magnet 1512. In this manner, the support portion 151 is separated as illustrated in FIG. 20(D). In addition, after the separation, the support portion 151 is rotated to the original position.

Figure 21:
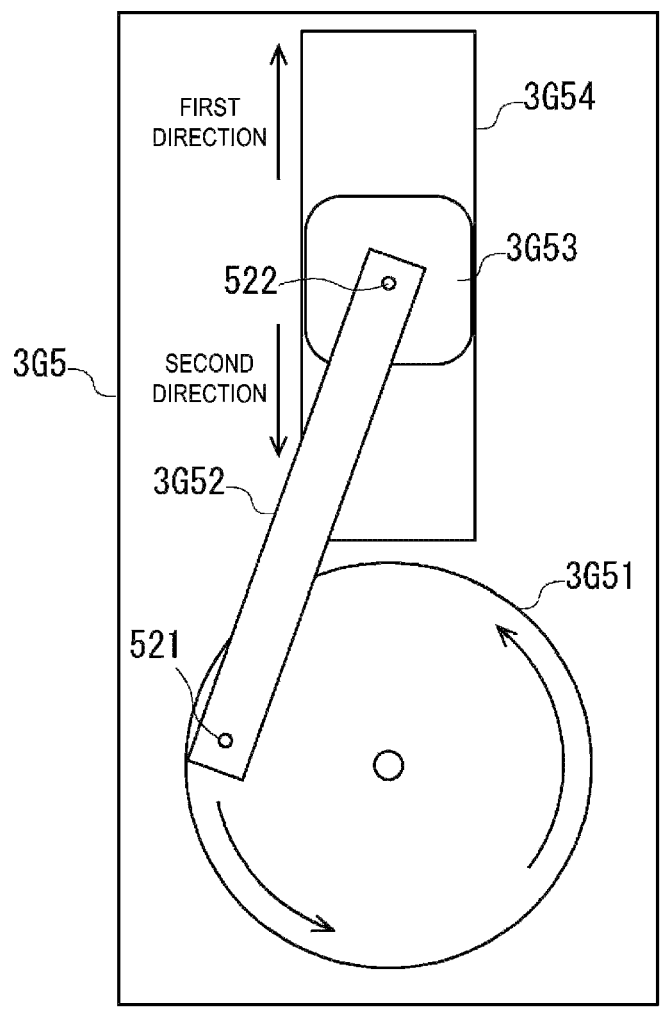
FIG. 21 is a diagram illustrating the configuration of a vibrator.

The stimulus application unit 3G includes, in the enclosure 3G1, a vibrator 3G5 that receives power supplied from the power supply unit 330 of the control unit 300 and vibrates. FIG. 21 is a diagram illustrating the configuration of the vibrator 3G5. The vibrator 3G5 includes a rotary wheel 3G51, a link 3G52, and a weight 3G53. The rotary wheel 3G51 is rotationally driven by a motor that is not illustrated. One end portion 521 of the link 3G52 is pivotally attached to a circumferential edge portion of the rotary wheel 3G51, and the other end portion 522 thereof is pivotally attached to the weight 3G53. The weight 3G53 is fitted into a linear groove 3G54 and is slidable along the groove 3G54.

When receiving a control signal from the controller 310, the stimulus application unit 3G rotates the rotary wheel 3G51 in response to the control signal, and the end portion 521 of the link 3G52 rotates in accordance with the rotation to reciprocate the weight 3G53 connected to the other end portion 522 in a first direction and a second direction along the groove 3G54, whereby vibration is generated. In addition, the stimulus application unit 3G operates such that the acceleration when the weight 3G53 moves in a specific direction in response to the control signal is higher than the acceleration when the weight 3G53 moves in another direction. For example, the stimulus application unit 3G operates such that the acceleration when the weight 3G53 moves in the first direction is higher than the acceleration when the weight 3G53 moves in the second direction. Conversely, the stimulus application unit 3G may operate such that the acceleration when the weight 3G53 moves in the second direction is higher than the acceleration when the weight 3G53 moves in the first direction.

In a state where the stimulus application unit 3G is worn on the shoulders of the occupant, the stimulus application unit 3G applies, to the occupant, vibration having an acceleration biased depending on the direction, as a stimulus. In this case, the occupant feels as if actual acceleration was generated in the direction in which the acceleration is increased and changes the posture such that the occupant is pulled in the direction. Therefore, in the present embodiment, the vibrator 3G5 disposed such that the first direction and the second direction of the vibrator 3G5 coincide with the vehicle front-rear direction and the vibrator 3G5 disposed such that the first direction and the second direction coincide with the vehicle width direction (left-right direction) are provided in the respective stimulus application units 3G to be worn on the left and right shoulders. Thus, the posture of the occupant can be controlled in the front-rear direction and the left-right direction. Moreover, the configuration of the stimulus application units 3G is not limited to that described above. One of the stimulus application units 3G worn on the left and right shoulders may include the vibrator 3G5 disposed such that the first direction and the second direction of the vibrator 3G5 coincide with the vehicle front-rear direction, and the other of the stimulus application units 3G may include the vibrator 3G5 disposed such that the first direction and the second direction coincide with the vehicle width direction (left-right direction).

Third Modification

Figure 22:
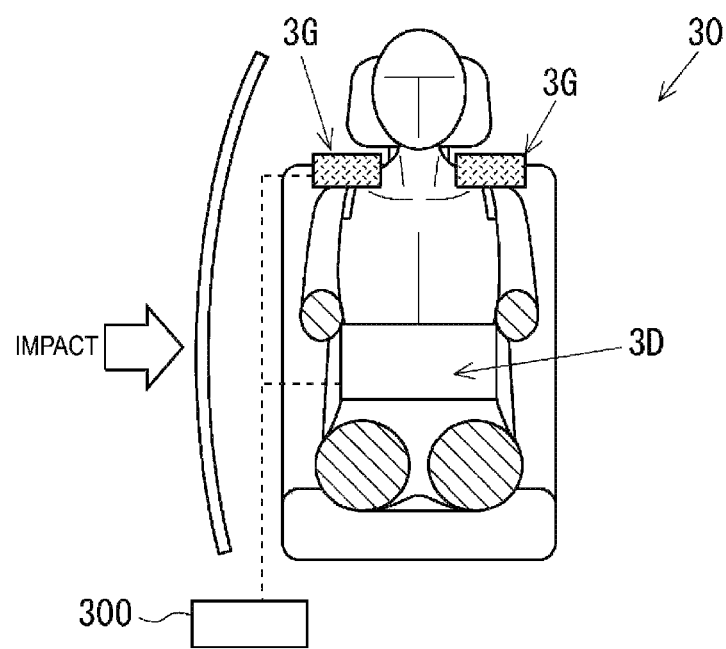
FIG. 22 is a diagram illustrating the configuration of an occupant protection device according to a third modification.

FIG. 22 is a diagram illustrating the configuration of the occupant protection device 30 according to a third modification. The present modification is different from the aforementioned first to sixth embodiments in the configuration in which a plurality of the stimulus application units are provided, and the other configurations are the same as those of the first to sixth embodiments. In the present modification, as illustrated in FIG. 22, the same stimulus application unit 3D as that of the fourth embodiment and the same stimulus application unit 3G as that of the sixth embodiment are provided.

Note that the control of each of the stimulus application unit 3D and the control of the stimulus application unit 3G are the same as those in the aforementioned embodiments, and these stimulus application units may be operated in combination or may be operated simultaneously.

Seventh Embodiment

Figure 23:
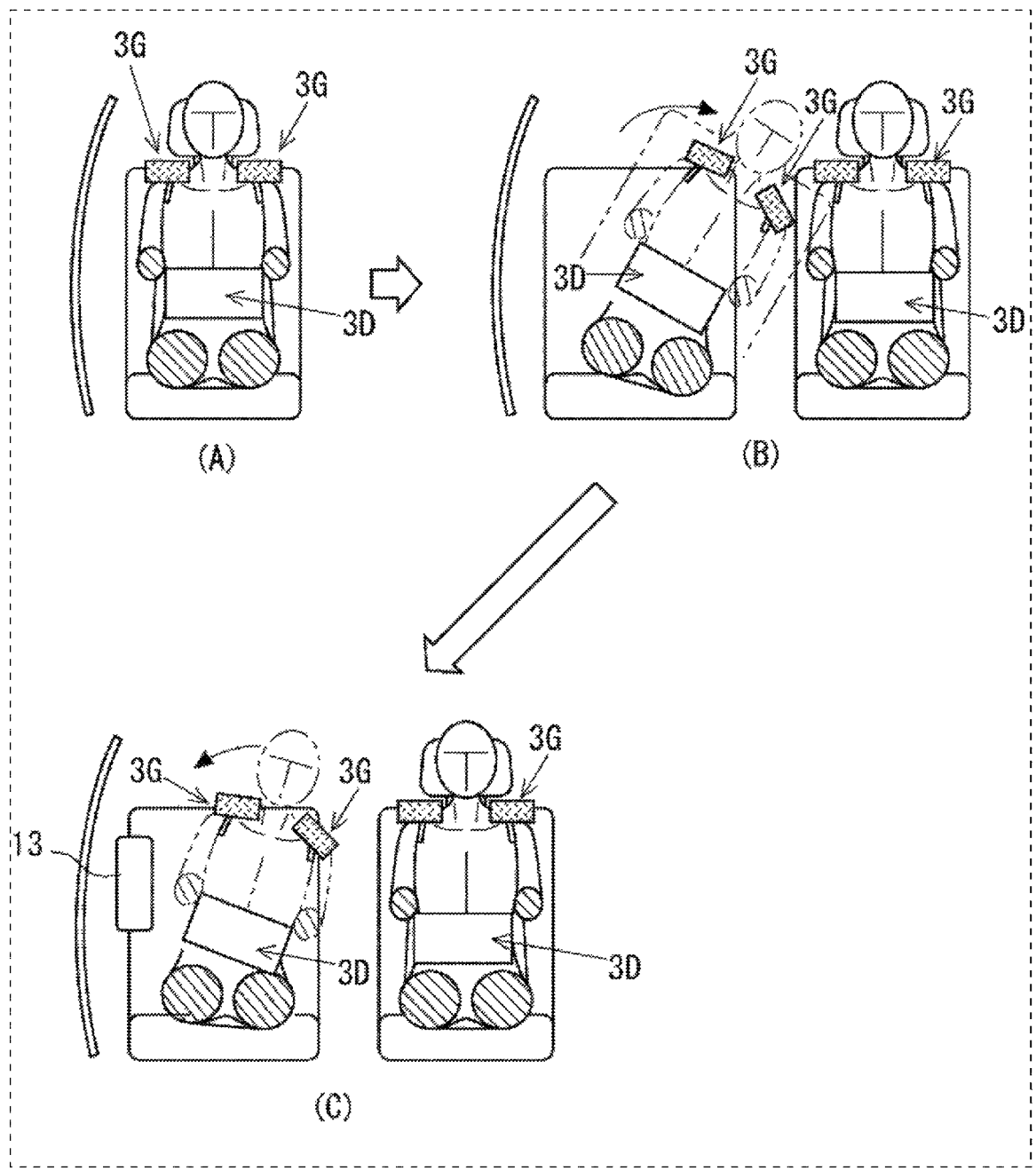
FIG. 23 is a diagram illustrating the configuration of an occupant protection device according to a seventh embodiment.
Figure 24:
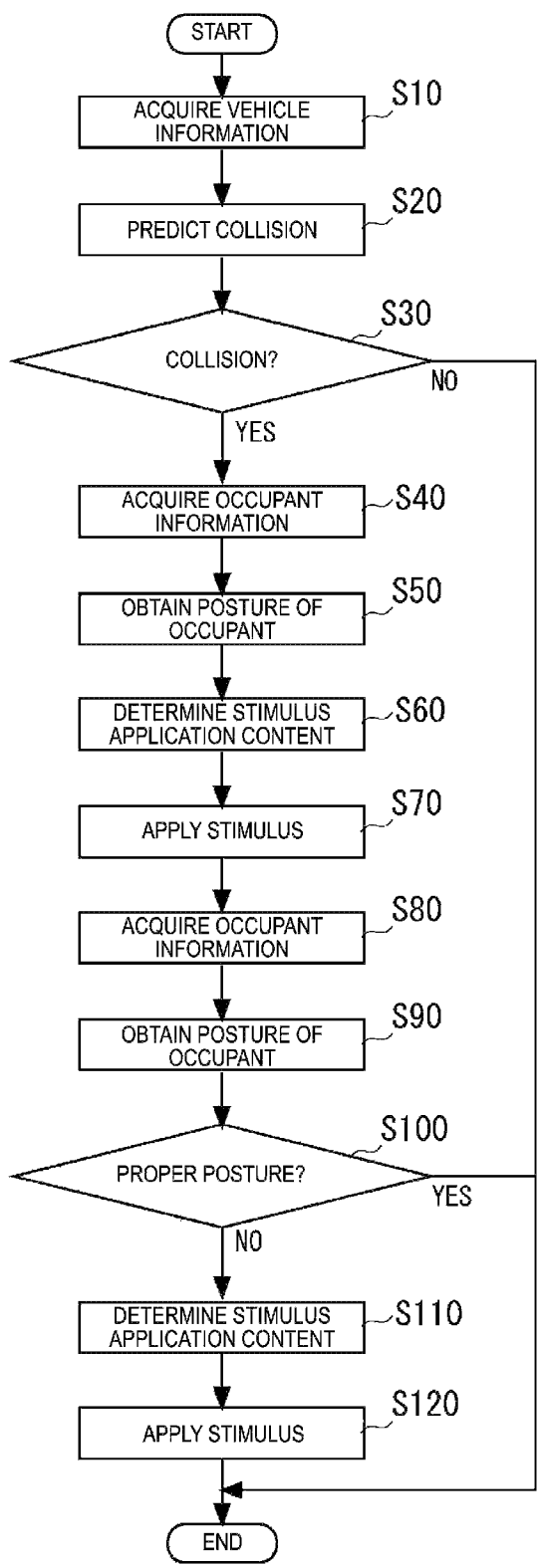
FIG. 24 is a diagram illustrating the processing procedure of an occupant protection method executed by the occupant protection device according to the seventh embodiment.

FIG. 23 is a diagram illustrating the configuration of the occupant protection device 30 according to a seventh embodiment. FIG. 24 is a diagram illustrating the processing procedure of an occupant protection method that is executed by the occupant protection device 30 according to the seventh embodiment. The present embodiment is different from the aforementioned first to sixth embodiments in the configuration in which a plurality of the stimulus application units are provided and the processing for correcting the posture that is excessively moved by a first stimulus is performed. Note that since the other configurations are the same as those of the first to sixth embodiments, the same elements are denoted by the same reference numerals or the like and the description thereof will not be repeated.

In the present embodiment, as illustrated in FIG. 23(A), the same stimulus application unit 3D as that in the fourth embodiment (a first stimulus application unit) and the same stimulus application unit 3G as that in the sixth embodiment (a second stimulus application unit) are provided as the plurality of stimulus application units.

As illustrated in FIG. 24, in the occupant protection method that is executed by the occupant protection device 30 of the present embodiment, from step S10 to step S70, the posture of an occupant is controlled by stimulating, with the stimulus application unit 3D, the occupant as in the aforementioned fourth embodiment. In FIG. 23, the occupant is predicted to receive an impact from the right side, and the occupant is inclined to the left side.

In step S80, the controller 310 acquires occupant information from the sensor Then, in step S90, the controller 310 obtains the posture of the occupant based on the acquired occupant information.

In step S100, the controller 310 determines whether the posture obtained in step S90 is a posture appropriately prepared for the impact. When an affirmative determination is made here, the controller 310 ends the processing of FIG. 24, and when the inclination of the occupant is too large as illustrated in FIG. 23(B) and a negative determination is made, the processing shifts to step S110.

In Step S110, the controller 310 determines second stimulus application content necessary for correcting the posture prepared for the impact on the vehicle.

In step S120, the controller 310 activates the stimulus application unit 3G in accordance with the second stimulus application content determined in step S110.

As described above, according to the present embodiment, even when the occupant is excessively moved by the first stimulus, the posture of the occupant can be corrected by the second stimulus to an appropriate posture prepared for the impact.

Eighth Embodiment

Figure 25:
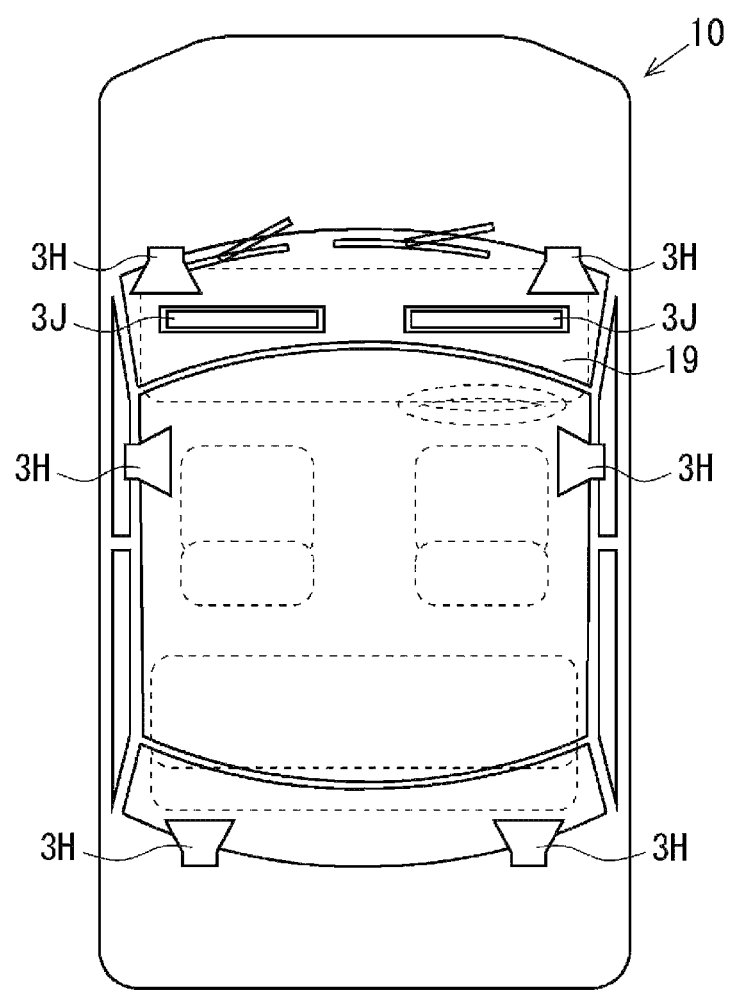
FIG. 25 is a schematic plan view illustrating an auxiliary stimulus application unit according to an eighth embodiment.
Figure 26:
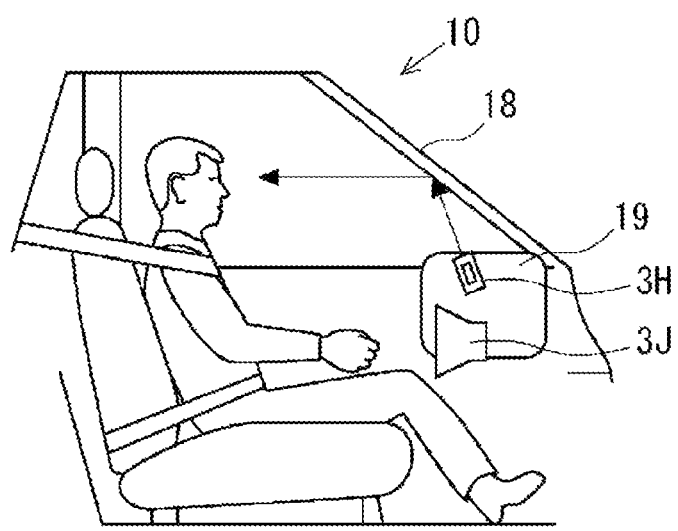
FIG. 26 is a diagram illustrating the auxiliary stimulus application unit disposed near a driver seat.

FIG. 25 is a schematic plan view illustrating auxiliary stimulus application units according to an eighth embodiment. FIG. 26 is a diagram illustrating the auxiliary stimulus application unit disposed near a driver seat. The present embodiment is different from the aforementioned first to seventh embodiments in the configuration in which the auxiliary stimulus application units are provided. Note that since the other configurations are the same as those of the first to seventh embodiments, the same elements are denoted by the same reference numerals or the like and the description thereof will not be repeated.

As illustrated in FIG. 25, the occupant protection device 30 of the present embodiment includes a plurality of auxiliary stimulus application units (speakers) 3H that give sound as a stimulus to an occupant. Also, the occupant protection device 30 of the present embodiment includes auxiliary stimulus application units (projectors) 3J that give an image as a stimulus to the occupant. As illustrated in FIG. 26, the auxiliary stimulus application units 3J are head-up displays that are disposed in a dashboard 19 of the vehicle 10 and project a stereoscopic image onto a front window (a windshield) 18. Note that the auxiliary stimulus application units 3J are not limited to the configuration described above, and a display device disposed in the vehicle may be used for display.

Figure 27:
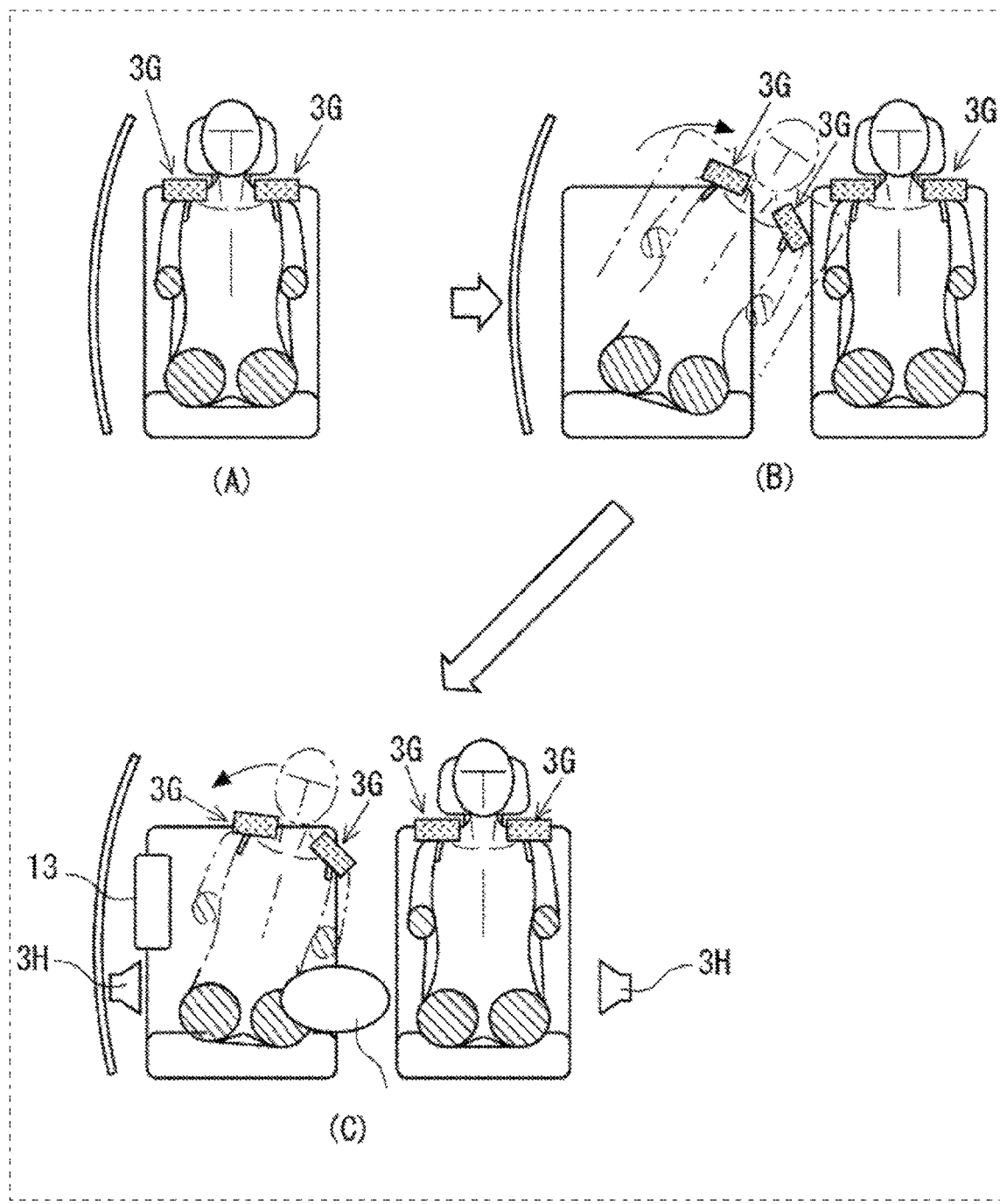
FIG. 27 is a diagram for explaining the operation of the stimulus application unit and the auxiliary stimulus application unit according to the eighth embodiment.

FIG. 27 is a diagram for explaining the operation of the stimulus application units and the auxiliary stimulus application units according to the eighth embodiment. Additionally, in the present embodiment, the processing procedure for applying a stimulus with the auxiliary stimulus application units 3H, 3J is similar to the processing procedure for applying a stimulus with the second stimulus application unit in the aforementioned seventh embodiment. Also, the same stimulus application unit 3G as that of the sixth embodiment is provided as the first stimulus application unit.

As illustrated in FIG. 27(A), when the occupant is predicted to receive an impact from the right side, the controller 310 activates the stimulus application unit 3G to move the occupant to the left side such that the occupant is kept away from the impact.

In this case, when the occupant is excessively moved as illustrated in FIG. 27(B), the second stimulus application content for correcting the posture is determined, and the auxiliary stimulus application units 3H, 3J are activated in accordance with the second stimulus application content. For example, by projecting an image onto the front window with the auxiliary stimulus application unit 3J, the image in which a flying object 17 flies toward the occupant is displayed to the occupant as illustrated in FIG. 27(C). Additionally, in accordance with this display, the sound of the approaching flying object 17 is output from the auxiliary stimulus application units (speakers) 3H, and this sound image is moved in a manner similar to that of the flying object 17. As a result, the occupant is controlled to take a proper posture by slightly returning the body to avoid the flying object 17.

As described above, according to the present embodiment, even when the posture of the occupant is excessively changed by the first stimulus, the posture can be corrected by an auxiliary stimulus using sound or an image to an appropriate posture prepared for the impact.

The embodiments of the occupant protection device according to the present disclosure are described above; however, each aspect disclosed in the present specification can be combined with any of the other features disclosed in the present specification.

REFERENCE SIGNS LIST

1 Occupant protection system
3A to 3F Stimulus application unit
B29, 3B30 Electrode
4 Dedicated clothing (suit)
5 Stimulus application unit main body
10 Vehicle
11, 20 Sensor
12 Automatic brake control device
30 Occupant protection device
111 Camera
112 Radar device
300 Control unit

The invention claimed is:

1. An occupant protection device, comprising:
a first sensor mounted on a vehicle and configured to output vehicle information including information indicating a traveling state of the vehicle and information indicating a situation around the vehicle;
a second sensor mounted on the vehicle and configured to output occupant information indicating a seating state of an occupant in the vehicle;
a plurality of stimulus applicators that are to be worn by the occupant and are configured to apply a stimulus to the occupant during operation; and
a controller configured to control the plurality of stimulus applicators, wherein
the plurality of stimulus applicators include a first stimulus applicator and a second stimulus applicator, and
the controller,
predicts, based on the vehicle information acquired from the first sensor, an impact to be received by the vehicle,
determines, based on the occupant information acquired from the second sensor, a stimulus application content by the plurality of stimulus applicators necessary for correcting a posture of the occupant to a posture prepared for the impact on the vehicle, when the impact on the vehicle is predicted, and
activates the first stimulus applicator in accordance with the determined stimulus application content then further determines, based on the occupant information acquired from the second sensor, a second stimulus application content necessary for correcting the posture of the occupant to a posture prepared for the impact on the vehicle, and activates the second stimulus applicator in accordance with the determined second stimulus application content, and thus corrects the posture of the occupant prior to a timing when the vehicle receives the impact.

2. The occupant protection device according to claim 1, wherein the controller determines an impact mode of the vehicle based on the vehicle information and determines the stimulus application content in accordance with the determined impact mode.

3. The occupant protection device according to claim 1, wherein the stimulus applicators apply at least one external stimulus of an electric current, heat, pressure, and vibration to the occupant.

4. The occupant protection device according to claim 1, further comprising an auxiliary stimulus applicator configured to give sound or an image as a stimulus to the occupant, wherein when the impact on the vehicle is predicted, the controller supplementally activates the auxiliary stimulus applicator prior to a timing when the vehicle receives the impact.

5. The occupant protection device according to claim 1, wherein the stimulus applicators include an electrode to be worn near a left ear of the occupant and an electrode to be worn near a right ear of the occupant, and apply a stimulus to the occupant when electricity flows between the left and right electrodes.

6. The occupant protection device according to claim 1, wherein the stimulus applicators include a first electrode to be worn near and in front of an ear of the occupant and a second electrode to be worn near and behind the ear of the occupant, and apply a stimulus to the occupant when electricity flows between the first electrode and the second electrode.

7. The occupant protection device according to claim 1, wherein the stimulus applicators include:
a wearing unit to be worn by the occupant; and
a stimulus applying pad disposed on the wearing unit such that the stimulus applying pad is to be in contact with skin of the occupant wearing the wearing unit.

8. The occupant protection device according to claim 1, wherein
the stimulus applicators include an actuator to be worn on an ear auricle of the occupant, and
the actuator pulls the ear auricle to apply a stimulus to the occupant.

9. The occupant protection device according to claim 1, wherein
the stimulus applicators include vibrators mounted respectively on left and right shoulders of the occupant, and
the vibrators vibrate to apply a stimulus to the occupant.

10. The occupant protection device according to claim 1, wherein the controller activates the plurality of applicators at different timings.

11. An occupant protection method, comprising:
acquiring vehicle information including information indicating a traveling state of a vehicle and a situation around the vehicle from a first sensor mounted on the vehicle and predicting, based on the acquired vehicle information, an impact to be received by the vehicle;
acquiring occupant information indicating a seating state of an occupant in the vehicle from a second sensor mounted on the vehicle and determining, based on the acquired occupant information, a first stimulus application content for correcting a posture of the occupant to a posture prepared for the impact on the vehicle when the impact on the vehicle is predicted;
activating a first stimulus applicator in accordance with the determined first stimulus application content and thus correcting the posture of the occupant prior to a timing when the vehicle receives the impact;
further determining, based on the occupant information acquired from the second sensor, a second stimulus application content necessary for correcting the posture of the occupant, and
activating the second stimulus applicator, at a different timing from the first stimulus applicator, in accordance with the determined second stimulus application content.

12. An occupant protection device, comprising:
a first sensor mounted on a vehicle and configured to output vehicle information including information indicating a traveling state of the vehicle and a situation around the vehicle;
a second sensor mounted on the vehicle and configured to output occupant information indicating a seating state of an occupant in the vehicle;
a first stimulus applicator and a second stimulus applicator worn by the occupant and configured to apply a stimulus to the occupant during operation; and
a controller configured to control the first and second stimulus applicators, wherein the controller,
predicts, based on the vehicle information acquired from the first sensor, an impact to be received by the vehicle,
determines, based on the occupant information acquired from the second sensor, a first stimulus application content necessary for correcting a posture of the occupant to a posture prepared for the impact on the vehicle, when the impact on the vehicle is predicted,
activates the first stimulus applicator in accordance with the determined first stimulus application content and thus corrects the posture of the occupant prior to a timing when the vehicle receives the impact,
further determines, based on the occupant information acquired from the second sensor, a second stimulus application content necessary for correcting the posture of the occupant, and
activates the second stimulus applicator, at a different timing from the first stimulus applicator, in accordance with the determined second stimulus application content.

* * * * *